US010625821B2

(12) United States Patent
Yokoi et al.

(10) Patent No.: US 10,625,821 B2
(45) Date of Patent: Apr. 21, 2020

(54) BICYCLE SPROCKET AND BICYCLE SPROCKET ASSEMBLY

(71) Applicant: SHIMANO INC., Sakai (JP)

(72) Inventors: Ken Yokoi, Sakai (JP); Akinobu Sugimoto, Sakai (JP)

(73) Assignee: SHIMANO INC., Sakai (JP)

( * ) Notice: Subject to any disclaimer, the term of this patent is extended or adjusted under 35 U.S.C. 154(b) by 265 days.

(21) Appl. No.: 15/686,122

(22) Filed: Aug. 24, 2017

(65) Prior Publication Data

US 2018/0265168 A1    Sep. 20, 2018

Related U.S. Application Data

(63) Continuation-in-part of application No. 15/461,582, filed on Mar. 7, 2017, now abandoned.

(51) Int. Cl.
*B62M 9/124* (2010.01)
*F16H 55/30* (2006.01)
*B62M 9/10* (2006.01)
*B60B 27/02* (2006.01)

(52) U.S. Cl.
CPC ............ *B62M 9/124* (2013.01); *B62M 9/105* (2013.01); *F16H 55/30* (2013.01); *B60B 27/023* (2013.01)

(58) Field of Classification Search
CPC ....... B62M 9/124; B62M 9/105; F16H 55/30; B60B 27/023
See application file for complete search history.

(56) References Cited

U.S. PATENT DOCUMENTS

| 4,988,328 A | 1/1991 | Iwasaki et al. | |
|---|---|---|---|
| 5,192,248 A * | 3/1993 | Nagano | B62M 9/10 474/140 |
| 5,413,534 A * | 5/1995 | Nagano | B62M 9/10 474/160 |
| 2013/0139642 A1* | 6/2013 | Reiter | B62M 9/105 74/594.2 |
| 2014/0013900 A1* | 1/2014 | Shiraishi | B62M 9/105 74/594.2 |
| 2015/0210352 A1* | 7/2015 | Sugimoto | B62M 9/105 474/80 |

(Continued)

FOREIGN PATENT DOCUMENTS

| JP | 49-101437 U | 12/1974 |
|---|---|---|
| JP | 02-115787 U | 9/1990 |
| TW | M481880 U | 7/2014 |

*Primary Examiner* — Michael R Mansen
*Assistant Examiner* — Robert T Reese
(74) *Attorney, Agent, or Firm* — Mori & Ward, LLP

(57) ABSTRACT

A bicycle sprocket comprises a first sprocket body, first sprocket teeth, a first side surface, a second side surface, at least one shifting facilitation projection, at least one guide portion, and at least one recess. The at least one guide portion is provided on a first side surface to guide a bicycle chain from the bicycle sprocket toward a smaller sprocket in a second shifting operation. The at least one recess is provided on the first side surface so as to be adjacent to the at least one guide portion in a circumferential direction defined about a rotational center axis. At least one of the at least one recess is provided in an upstream angular area defined from the at least one shifting facilitation projection to an upstream side in a driving state and within 90 degrees in the circumferential direction.

34 Claims, 34 Drawing Sheets

(56) References Cited

U.S. PATENT DOCUMENTS

2015/0217834 A1* 8/2015 Iwai ................ B62M 9/105
    474/152
2016/0208903 A1* 7/2016 Goates ............... F16H 55/303
2018/0105229 A1* 4/2018 Reinbold ............ B62M 9/122

* cited by examiner

BICYCLE SPROCKET AND BICYCLE SPROCKET ASSEMBLY

CROSS-REFERENCE TO RELATED APPLICATIONS

The present application is a continuation-in-part application of the U.S. patent application Ser. No. 15/461,582 filed Mar. 17, 2017. The contents of this application are incorporated herein by reference in their entirety.

BACKGROUND OF THE INVENTION

Field of the Invention

The present invention relates to a bicycle sprocket and a bicycle sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket. (See, e.g., Taiwanese Utility Model Application Publication No. M481880, Japanese Utility Model Registration Publication No. S49-101437, and Japanese Utility Model Application Publication No. H2-115787.)

SUMMARY OF THE INVENTION

In accordance with a first aspect of the present invention, a bicycle sprocket comprises a first sprocket body, first sprocket teeth, a first side surface, a second side surface, at least one shifting facilitation projection, at least one guide portion, and at least one recess. The first sprocket teeth extend radially outwardly from the first sprocket body to define a first chain-phase state where at least one of the first sprocket teeth is received in only one of an inner link space defined between an opposed pair of inner link plates of a bicycle chain, and an outer link space defined between an opposed pair of outer link plates of the bicycle chain. The first side surface is provided on the first sprocket body and faces toward a first side of an axial direction of a rotational center axis of the bicycle sprocket. The second side surface is provided on the first sprocket body and faces toward a second side of the axial direction reverse to the first side. The at least one shifting facilitation projection is configured to facilitate a first shifting operation in which the bicycle chain is shifted from a smaller sprocket to the bicycle sprocket. The at least one guide portion is provided on the first side surface to guide the bicycle chain from the bicycle sprocket toward the smaller sprocket in a second shifting operation in which the bicycle chain is shifted from the bicycle sprocket to the smaller sprocket. The at least one recess is provided on the first side surface so as to be adjacent to the at least one guide portion in a circumferential direction defined about the rotational center axis. At least one of the at least one recess is provided in an upstream angular area defined from the at least one shifting facilitation projection to an upstream side in a driving state where the bicycle sprocket is rotated about the rotational center axis during pedaling and within 90 degrees in the circumferential direction.

With the bicycle sprocket according to the first aspect, the at least one guide portion smoothens the second shifting operation in which the bicycle chain is shifted from the bicycle sprocket to the smaller sprocket. Furthermore, the at least one recess reduces interference between the bicycle sprocket and the bicycle chain in a state where the bicycle chain is engaged with the smaller sprocket even the bicycle sprocket comprises the at least one guide portion.

In accordance with a second aspect of the present invention, a bicycle sprocket comprises a first sprocket body, first sprocket teeth, a first side surface, a second side surface, at least one guide portion, and at least one recess. The first sprocket teeth extend radially outwardly from the first sprocket body to define a first chain-phase state where at least one of the first sprocket teeth is received in only one of an inner link space defined between an opposed pair of inner link plates of a bicycle chain, and an outer link space defined between an opposed pair of outer link plates of the bicycle chain. The first side surface is provided on the first sprocket body and facing toward a first side of an axial direction of a rotational center axis of the bicycle sprocket. The second side surface is provided on the first sprocket body and facing toward a second side of the axial direction reverse to the first side. The at least one guide portion is provided on the first side surface to guide the bicycle chain from the bicycle sprocket toward a smaller sprocket in a shifting operation in which the bicycle chain is shifted from the bicycle sprocket to the smaller sprocket. The at least one recess is provided on the first side surface so as to be adjacent to the at least one guide portion in a circumferential direction defined about the rotational center axis. At least one of the at least one recess is provided in an upstream angular range defined from a dead center to an upstream side in a driving state where the bicycle sprocket is rotated about the rotational center axis during pedaling and within 90 degrees in the circumferential direction.

With the bicycle sprocket according to the second aspect, the at least one guide portion smoothens the shifting operation in which the bicycle chain is shifted from the bicycle sprocket to the smaller sprocket. Furthermore, the at least one recess reduces interference between the bicycle sprocket and the bicycle chain in a state where the bicycle chain is engaged with the smaller sprocket even the bicycle sprocket comprises the at least one guide portion.

In accordance with a third aspect of the present invention, the bicycle sprocket according to the first or second aspect is configured so that at least one of the at least one guide portion is provided in an upstream angular range defined from a dead center to the upstream side and within 90 degrees in the circumferential direction.

With the bicycle sprocket according to the third aspect, the at least one guide portion further smoothens the second shifting operation in which the bicycle chain is shifted from the bicycle sprocket to the smaller sprocket.

In accordance with a fourth aspect of the present invention, the bicycle sprocket according to the third aspect is configured so that the at least one guide portion includes guide portions each provided on the first side surface to guide the bicycle chain from the bicycle sprocket toward the smaller sprocket in the second shifting operation. At least two of the guide portions are provided in the upstream angular range.

With the bicycle sprocket according to the fourth aspect, the guide portions further smoothen the second shifting operation in which the bicycle chain is shifted from the bicycle sprocket to the smaller sprocket.

In accordance with a fifth aspect of the present invention, the bicycle sprocket according to the fourth aspect is configured so that the at least one recess is provided between adjacent two of the guide portions in the circumferential direction.

With the bicycle sprocket according to the fifth aspect, at least one recess effectively reduces interference between the bicycle sprocket and the bicycle chain in the state where the bicycle chain is engaged with the smaller sprocket even the bicycle sprocket comprises the at least one guide portion.

In accordance with a sixth aspect of the present invention, the bicycle sprocket according to the fourth or fifth aspect is configured so that the at least one recess includes recesses provided on the first side surface to reduce interference between the bicycle sprocket and the bicycle chain. The recesses and the guide portions are alternately arranged in the circumferential direction.

With the bicycle sprocket according to the sixth aspect, the recesses further reduce interference between the bicycle sprocket and the bicycle chain in the state where the bicycle chain is engaged with the smaller sprocket even the bicycle sprocket comprises the at least one guide portion.

In accordance with a seventh aspect of the present invention, the bicycle sprocket according to any one of the first to sixth aspects is configured so that the at least one guide portion is provided on the first side surface to face an inner link plate of the bicycle chain in the axial direction in a state where the bicycle chain is engaged with the smaller sprocket to transmit a pedaling force between the smaller sprocket and the bicycle chain.

With the bicycle sprocket according to the seventh aspect, the arrangement of the at least one guide portion allows an axial height of the at least one guide portion to increase with reducing interference between the bicycle sprocket and the bicycle chain in the state where the bicycle chain is engaged with the smaller sprocket.

In accordance with an eighth aspect of the present invention, the bicycle sprocket according to the seventh aspect is configured so that the at least one guide portion is configured to be provided between adjacent outer link plates of the bicycle chain in a chain running direction in the state where the bicycle chain is engaged with the smaller sprocket to transmit the pedaling force between the smaller sprocket and the bicycle chain.

With the bicycle sprocket according to the eighth aspect, the arrangement of the at least one guide portion allows an axial height of the at least one guide portion to further increase with reducing interference between the bicycle sprocket and the bicycle chain in the state where the bicycle chain is engaged with the smaller sprocket.

In accordance with a ninth aspect of the present invention, the bicycle sprocket according to any one of the first to eighth aspects is configured so that the at least one guide portion extends radially inwardly from a downstream side reverse to the upstream side toward the upstream side as viewed in the axial direction.

With the bicycle sprocket according to the ninth aspect, the at least one guide portion can be disposed along a path of the bicycle chain in the first shifting operation. Thus, the at least one guide portion stably supports the bicycle chain in the first shifting operation.

In accordance with a tenth aspect of the present invention, the bicycle sprocket according to any one of the first to ninth aspects is configured so that the smaller sprocket includes a reference tooth. The reference tooth has a maximum axial width and a tooth-center plane. The maximum axial width is defined in the axial direction. The tooth-center plane is defined to bisect the maximum axial width. An axial distance is defined between the at least one guide portion and the tooth-center plane in the axial direction. The axial distance is equal to or larger than 4.5 mm and is equal to or smaller than 8 mm.

With the bicycle sprocket according to the tenth aspect, the at least one guide portion having the maximum amount of protrusion further smoothens the second shifting operation in which the bicycle chain is shifted from the bicycle sprocket to the smaller sprocket.

In accordance with an eleventh aspect of the present invention, the bicycle sprocket according to any one of the first to tenth aspects is configured so that the at least one guide portion has a maximum circumferential length defined in the circumferential direction. The maximum circumferential length is equal to or smaller than 5 mm.

With the bicycle sprocket according to the eleventh aspect, the at least one guide portion having the maximum circumferential length further reduces interference between the bicycle sprocket and the bicycle chain in the state where the bicycle chain is engaged with the smaller sprocket even the bicycle sprocket comprises the at least one guide portion.

In accordance with a twelfth aspect of the present invention, the bicycle sprocket according to any one of the first to eleventh aspects is configured so that the at least one recess is provided on the first side surface to face a portion of an outer link plate of the bicycle chain in the axial direction in a state where the bicycle chain is engaged with the smaller sprocket to transmit a pedaling force between the smaller sprocket and the bicycle chain.

With the bicycle sprocket according to the twelfth aspect, the arrangement of the at least one recess further reduces interference between the bicycle sprocket and the bicycle chain in the state where the bicycle chain is engaged with the smaller sprocket even the bicycle sprocket comprises the at least one guide portion.

In accordance with a thirteenth aspect of the present invention, the bicycle sprocket according to the twelfth aspect is configured so that the at least one recess has a recess circumferential length defined in the circumferential direction. The recess circumferential length is larger than a circumferential length of the portion of the outer link plate.

With the bicycle sprocket according to the thirteenth aspect, the at least one recess having the recess circumferential length further reduces interference between the bicycle sprocket and the bicycle chain in the state where the bicycle chain is engaged with the smaller sprocket even the bicycle sprocket comprises the at least one guide portion.

In accordance with a fourteenth aspect of the present invention, the bicycle sprocket according to any one of the first to thirteenth aspects is configured so that the at least one recess comprises a through-hole extending from the first side surface to the second side surface in the axial direction.

With the bicycle sprocket according to the fourteenth aspect, the through-hole reduces interference between the bicycle sprocket and the bicycle chain in the state where the bicycle chain is engaged with the smaller sprocket even the bicycle sprocket comprises the at least one guide portion with saving weight of the bicycle sprocket.

In accordance with a fifteenth aspect of the present invention, a bicycle sprocket assembly comprises the bicycle sprocket according to any one of the first to fourteenth aspects and the smaller sprocket. The smaller sprocket comprises a second sprocket body and second sprocket teeth. The second sprocket teeth extend radially outwardly from the second sprocket body to define a second chain-phase state where at least one of the second sprocket teeth is received in only one of the inner link space and the outer link space.

With the bicycle sprocket assembly according to the fifteenth aspect, the at least one recess effectively reduces interference between the bicycle sprocket and the bicycle chain in the state where the bicycle chain is engaged with the smaller sprocket even the bicycle sprocket comprises the at least one guide portion since the smaller sprocket has only the second chain-phase state.

In accordance with a sixteenth aspect of the present invention, the bicycle sprocket assembly according to the fifteenth aspect is configured so that the second sprocket teeth include at least one inner-link tooth extending radially outwardly from the second sprocket body to be received in only the inner link space. The at least one guide portion extends radially outwardly from the at least one inner-link tooth as viewed in the axial direction.

With the bicycle sprocket assembly according to the sixteenth aspect, the at least one guide portion can be disposed along a path of the bicycle chain in the first shifting operation. Thus, the at least one guide portion stably supports the bicycle chain in the first shifting operation.

In accordance with a seventeenth aspect of the present invention, the bicycle sprocket assembly according to the sixteenth aspect is configured so that the at least one guide portion includes guide portions each provided on the first side surface to guide the bicycle chain from the bicycle sprocket toward the smaller sprocket in the second shifting operation. The at least one inner-link tooth includes inner-link teeth each extending radially outwardly from the second sprocket body to be received in only the inner link space. The guide portions respectively extend radially outwardly from the inner-link teeth as viewed in the axial direction.

With the bicycle sprocket assembly according to the seventeenth aspect, the at least one guide portion can be disposed along a path of the bicycle chain in the first shifting operation. Thus, the at least one guide portion stably supports the bicycle chain in the first shifting operation.

In accordance with an eighteenth aspect of the present invention, the bicycle sprocket assembly according to the sixteenth or seventeenth aspect is configured so that the at least one guide portion extends radially outwardly from the upstream side toward a downstream side reverse to the upstream side as viewed in the axial direction.

With the bicycle sprocket assembly according to the eighteenth aspect, the at least one guide portion can be disposed along a path of the bicycle chain in the first shifting operation. Thus, the at least one guide portion stably supports the bicycle chain in the first shifting operation.

In accordance with a nineteenth aspect of the present invention, the bicycle sprocket assembly according to any one of the fifteenth to eighteenth aspects is configured so that the second sprocket teeth include at least one outer-link tooth extending radially outwardly from the second sprocket body to be received in only the outer link space. The at least one recess is disposed radially outwardly of the at least one outer-link tooth as viewed in the axial direction.

With the bicycle sprocket assembly according to the nineteenth aspect, the at least one guide portion having the maximum circumferential length further reduces interference between the bicycle sprocket and the bicycle chain in the state where the bicycle chain is engaged with the smaller sprocket even the bicycle sprocket comprises the at least one guide portion.

In accordance with a twentieth aspect of the present invention, the bicycle sprocket assembly according to any one of the fifteenth to nineteenth aspects is configured so that the bicycle sprocket comprises a shifting facilitation area configured to facilitate at least one of the first shifting operation and the second shifting operation. At least one of the at least one guide portion is provided in the shifting facilitation area.

With the bicycle sprocket assembly according to the twentieth aspect, the shifting facilitation area and the guide portions further smoothen the second shifting operation in which the bicycle chain is shifted from the bicycle sprocket to the smaller sprocket.

In accordance with a twenty-first aspect of the present invention, the bicycle sprocket assembly according to any one of the fifteenth to twentieth aspect is configured so that the bicycle sprocket further comprises an additional shifting facilitation projection provided on the first side surface to facilitate the second shifting operation. At least one of the at least one guide portion is provided on the upstream side with respect to the additional shifting facilitation projection.

With the bicycle sprocket assembly according to the twenty-first aspect, the additional shifting facilitation projection and the guide portions further smoothen the second shifting operation in which the bicycle chain is shifted from the bicycle sprocket to the smaller sprocket.

In accordance with a twenty-second aspect of the present invention, the bicycle sprocket assembly according to any one of the fifteenth to twenty-first aspects is configured so that the second sprocket teeth include at least one outer-link tooth and at least one inner-link tooth. The at least one outer-link tooth extends radially outwardly from the second sprocket body to be received in only the outer link space. The at least one outer-link tooth has a larger maximum axial width defined in the axial direction. The at least one inner-link tooth extends radially outwardly from the second outer sprocket body to be received in only the inner link space. The at least one inner-link tooth has a smaller maximum axial width defined in the axial direction. The larger maximum axial width is larger than the smaller maximum axial width.

With the bicycle sprocket assembly according to the twenty-second aspect, it is possible to improve chain-holding performance of the smaller sprocket.

In accordance with a twenty-third aspect of the present invention, the bicycle sprocket assembly according to any one of the fifteenth to twenty-second aspects is configured so that the at least one guide portion includes guide portions. A total number of the guide portions is a half of a total number of the second sprocket teeth.

With the bicycle sprocket assembly according to the twenty-third aspect, the at least one recess more effectively reduces interference between the bicycle sprocket and the bicycle chain in the state where the bicycle chain is engaged with the smaller sprocket even the bicycle sprocket comprises the at least one guide portion since the smaller sprocket has only the second chain-phase state.

In accordance with a twenty-fourth aspect of the present invention, the bicycle sprocket assembly according to any one of the fifteenth to twenty-third aspects is configured so that the at least one guide portion includes a first guide portion and a second guide portion. The first guide portion is provided in the upstream angular area and has a first circumferential width defined in the circumferential direction. The second guide portion is provided outside the upstream angular area and has a second circumferential width defined in the circumferential direction. The first circumferential width is larger than the second circumferential width.

With the bicycle sprocket assembly according to the twenty-fourth aspect, it is possible to reduce wear of the first guide portion.

In accordance with a twenty-fifth aspect of the present invention, the bicycle sprocket assembly according to the twenty-fourth aspect is configured so that the first guide portion has a first maximum circumferential width. The first maximum circumferential width ranges from 6 mm to 8 mm.

With the bicycle sprocket assembly according to the twenty-fifth aspect, it is possible to reduce interference between the first guide portion and the bicycle chain in a state where the smaller sprocket is engaged with the bicycle chain.

In accordance with a twenty-sixth aspect of the present invention, the bicycle sprocket assembly according to the twenty-fourth or twenty-fifth aspect is configured so that the first guide portion has a first axial length defined from the first sprocket body in the axial direction. The second guide portion has a second axial length defined from the first sprocket body in the axial direction. The first axial length is substantially equal to the second axial length.

With the bicycle sprocket assembly according to the twenty-sixth aspect, it is possible to reduce interference between the first guide portion and the bicycle chain.

In accordance with a twenty-seventh aspect of the present invention, the bicycle sprocket assembly according to any one of the twenty-fourth to twenty-sixth aspects is configured so that the first sprocket body includes a resin part. The first guide portion and the second guide portion are integrally provided with the resin part as a one-piece unitary member.

With the bicycle sprocket assembly according to the twenty-seventh aspect, it is possible to simplify a manufacturing process of the bicycle sprocket.

In accordance with a twenty-eighth aspect of the present invention, the bicycle sprocket assembly according to any one of the fifteenth to twenty-seventh aspects is configured so that the at least one guide portion includes a first guide portion having a metallic part.

With the bicycle sprocket assembly according to the twenty-eighth aspect, it is possible to reduce wear of the first guide portion.

In accordance with a twenty-ninth aspect of the present invention, the bicycle sprocket assembly according to the twenty-eighth aspects is configured so that the metallic part is at least partly exposed from the first sprocket body.

With the bicycle sprocket assembly according to the twenty-ninth aspect, it is possible to effectively reduce wear of the first guide portion.

In accordance with a thirtieth aspect of the present invention, the bicycle sprocket assembly according to the twenty-eighth or twenty-ninth aspect is configured so that the first guide portion is provided in the upstream angular area. The at least one guide portion includes a second guide portion provided outside the upstream angular area. The second guide portion is made of a resin material.

With the bicycle sprocket assembly according to the thirtieth aspect, it is possible to save weight of the bicycle sprocket.

In accordance with a thirty-first aspect of the present invention, the bicycle sprocket assembly according to any one of the twenty-eighth to thirtieth aspects is configured so that the first sprocket body includes a resin part. The first guide portion is provided at the resin part.

With the bicycle sprocket assembly according to the thirty-first aspect, it is possible to save weight of the bicycle sprocket.

In accordance with a thirty-second aspect of the present invention, the bicycle sprocket assembly according to the thirty-first aspect is configured so that the metallic part is at least partly embedded in the resin part.

With the bicycle sprocket assembly according to the thirty-second aspect, it is possible to simplify a manufacturing process of the bicycle sprocket.

In accordance with a thirty-third aspect of the present invention, the bicycle sprocket assembly according to the thirty-first or thirty-second aspect is configured so that the at least one guide portion includes an additional guide portion. The additional guide portion is integrally provided with the resin part as a one-piece unitary member.

With the bicycle sprocket assembly according to the thirty-third aspect, it is possible to simplify a manufacturing process of the bicycle sprocket.

In accordance with a thirty-fourth aspect of the present invention, the bicycle sprocket assembly according to any one of the fifteenth to thirty-third aspects is configured so that the at least one guide portion includes guide portions. Downstream side surfaces of the guide portions are arranged in the circumferential direction at a first pitch.

With the bicycle sprocket assembly according to the thirty-fourth aspect, it is possible to reduce interference between the guide portions and the bicycle chain. This reduces wear of the guide portions.

In accordance with a thirty-fifth aspect of the present invention, a bicycle sprocket assembly comprises a larger sprocket and a smaller sprocket. The larger sprocket comprises a first sprocket body, first sprocket teeth, a first side surface, and a second side surface. The first sprocket teeth extend radially outwardly from the first sprocket body. The first side surface faces in an axial direction a rotational center axis of the bicycle sprocket assembly. The second side surface faces in the axial direction. The second side surface is provided on a reverse side of the first side surface in the axial direction. The smaller sprocket comprises a second sprocket body and second sprocket teeth. The second sprocket teeth extend radially outwardly from the second sprocket body to define a chain-phase state where at least one of the second sprocket teeth is received in only one of an inner link space defined between an opposed pair of inner link plates of a bicycle chain, and an outer link space defined between an opposed pair of outer link plates of the bicycle chain. The second sprocket teeth include at least one outer-link tooth and at least one inner-link tooth. The at least one outer-link tooth extends radially outwardly from the second sprocket body to be received in only the outer link space. The at least one inner-link tooth extends radially outwardly from the second sprocket body to be received in only the inner link space. The first sprocket body includes at least one recess provided on the first side surface to reduce interference between the larger sprocket and the bicycle chain. The at least one recess is disposed radially outwardly of the at least one outer-link tooth as viewed in the axial direction. The first sprocket body includes guide portions provided on the first side surface to guide the bicycle chain from the larger sprocket toward the smaller sprocket in a shifting operation in which the bicycle chain is shifted from the larger sprocket to the smaller sprocket. The guide portions define the at least one recess therebetween.

With the bicycle sprocket assembly according to the thirty-fifth aspect, the guide portions smoothen the shifting operation in which the bicycle chain is shifted from the larger sprocket to the smaller sprocket. Furthermore, the at least one recess reduces interference between the larger sprocket and the bicycle chain in a state where the bicycle chain is engaged with the smaller sprocket even the larger sprocket comprises the guide portions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
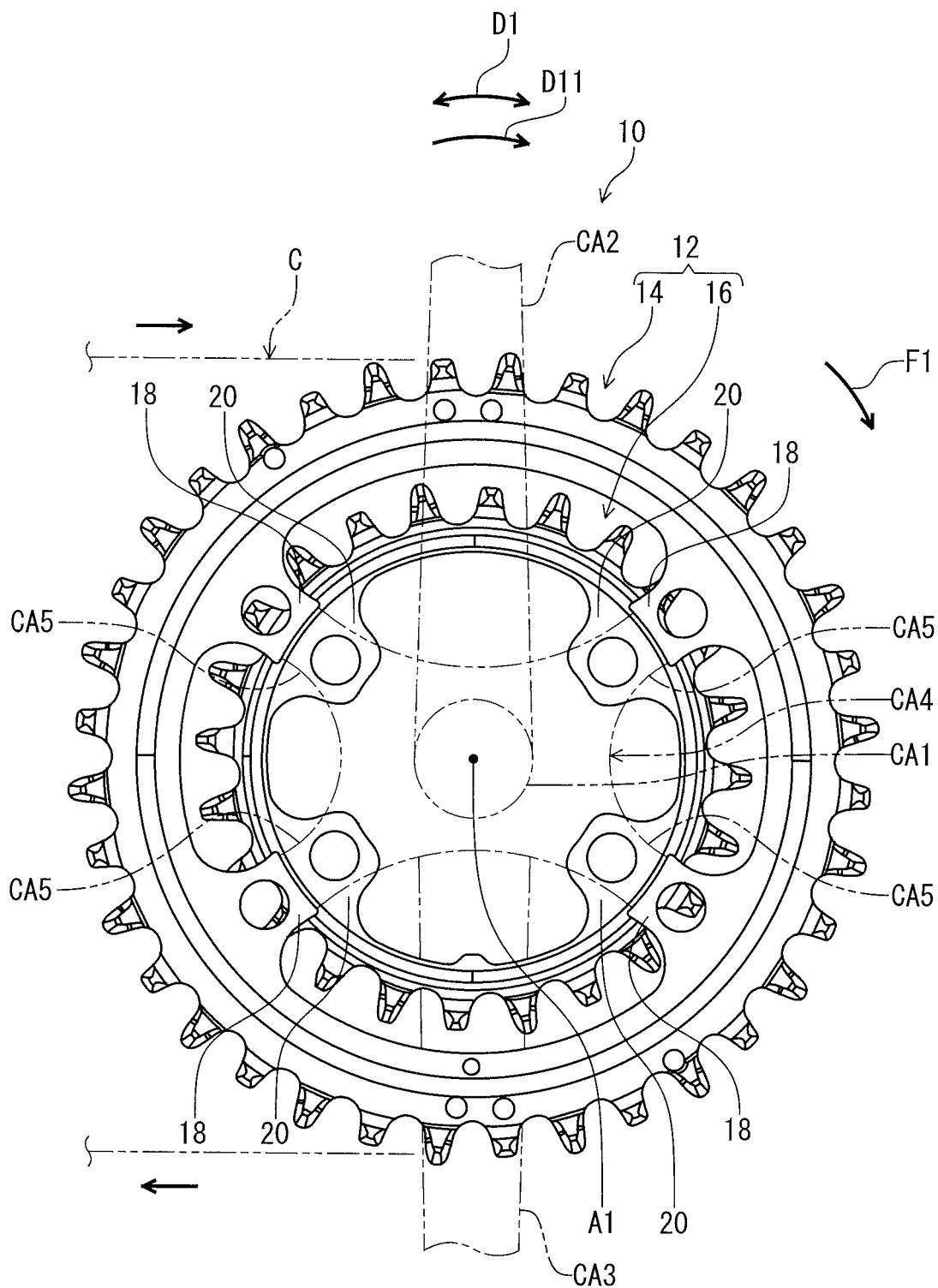
FIG. 1 is a side elevational view of a bicycle crank assembly including a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle crank assembly 10 includes a bicycle sprocket assembly 12 in accordance with a first embodiment. The bicycle crank assembly 10 includes a crank axle CA1, crank arms CA2 and CA3, and a sprocket mounting member CA4. The crank arms CA2 and CA3 and the sprocket mounting member CA4 are secured to the crank axle CA1. The bicycle sprocket assembly 12 is secured to the sprocket mounting member CA4. The bicycle sprocket assembly 12 is coupled to the crank axle CA1 to rotate integrally with the crank axle CA1 and the crank arms CA2 and CA3 about a rotational center axis A1. The bicycle sprocket assembly 12 is rotated about the rotational center axis A1 in a driving rotational direction D11 during pedaling. The driving rotational direction D11 is defined along a circumferential direction D1 defined about the rotational center axis A1. In this embodiment, the bicycle sprocket assembly 12 is a front sprocket assembly. However, a structure of the bicycle sprocket assembly 12 can be applied to a rear sprocket assembly.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 12, should be interpreted relative to the bicycle equipped with the bicycle sprocket assembly 12 as used in an upright riding position on a horizontal surface.

Figure 2:
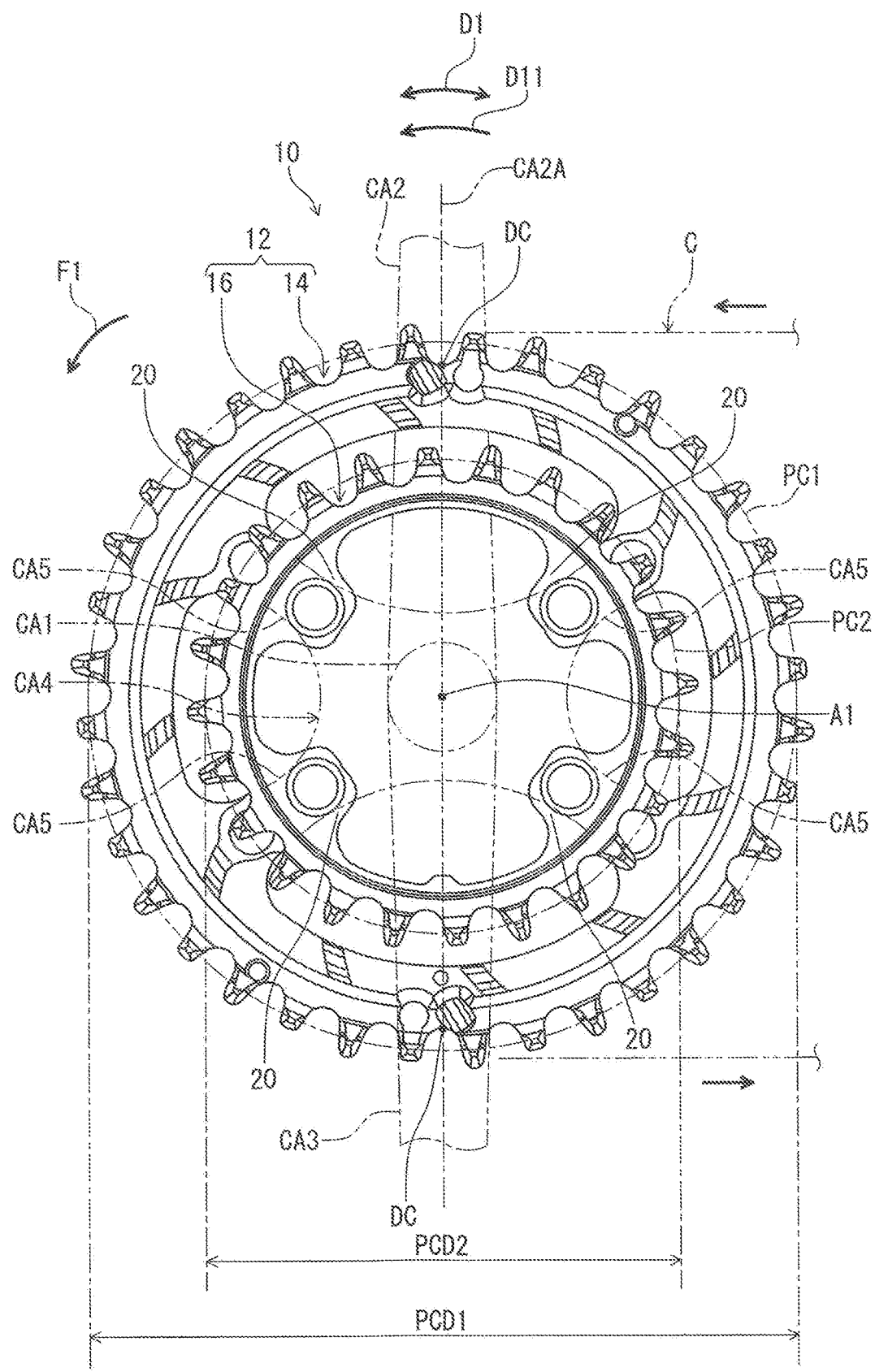
FIG. 2 is another side elevational view of the bicycle crank assembly illustrated in FIG. 1.

As seen in FIG. 2, the bicycle sprocket assembly 12 comprises a bicycle sprocket 14 (a larger sprocket) and a smaller sprocket 16. The bicycle sprocket 14 has a first pitch-circle diameter PCD1. The smaller sprocket 16 has a second pitch-circle diameter PCD2. The first pitch-circle diameter PCD1 is a diameter of a first pitch circle PC1 defined by centers C31 of pins C3 (FIG. 11) of a bicycle chain C engaged with the bicycle sprocket 14. The second pitch-circle diameter PCD2 is a diameter of a second pitch circle PC2 defined by the centers C31 of the pins C3 (FIG. 12) of the bicycle chain C engaged with the smaller sprocket 16. The first pitch-circle diameter PCD1 is larger than the second pitch-circle diameter PCD2. Thus, the bicycle sprocket 14 can also be referred to as a larger sprocket 14.

As seen in FIG. 1, the sprocket mounting member CA4 includes crank connecting arms CA5. The bicycle sprocket 14 comprises crank attachment portions 18. The smaller sprocket 16 comprises additional crank attachment portions 20. The crank connecting arms CA5 are respectively fastened to the crank attachment portions 18 by fasteners such as bolts (not shown). The additional crank attachment portions 20 are fastened to the sprocket mounting member CA4 by fasteners such as bolts (not shown).

Each of the bicycle sprocket 14 and the smaller sprocket 16 is engageable with the bicycle chain C to transmit a pedaling force F1 between the bicycle sprocket assembly 12 and the bicycle chain C. The bicycle chain C is shifted between the bicycle sprocket 14 and the smaller sprocket 16 by a derailleur (not shown).

Figure 3:
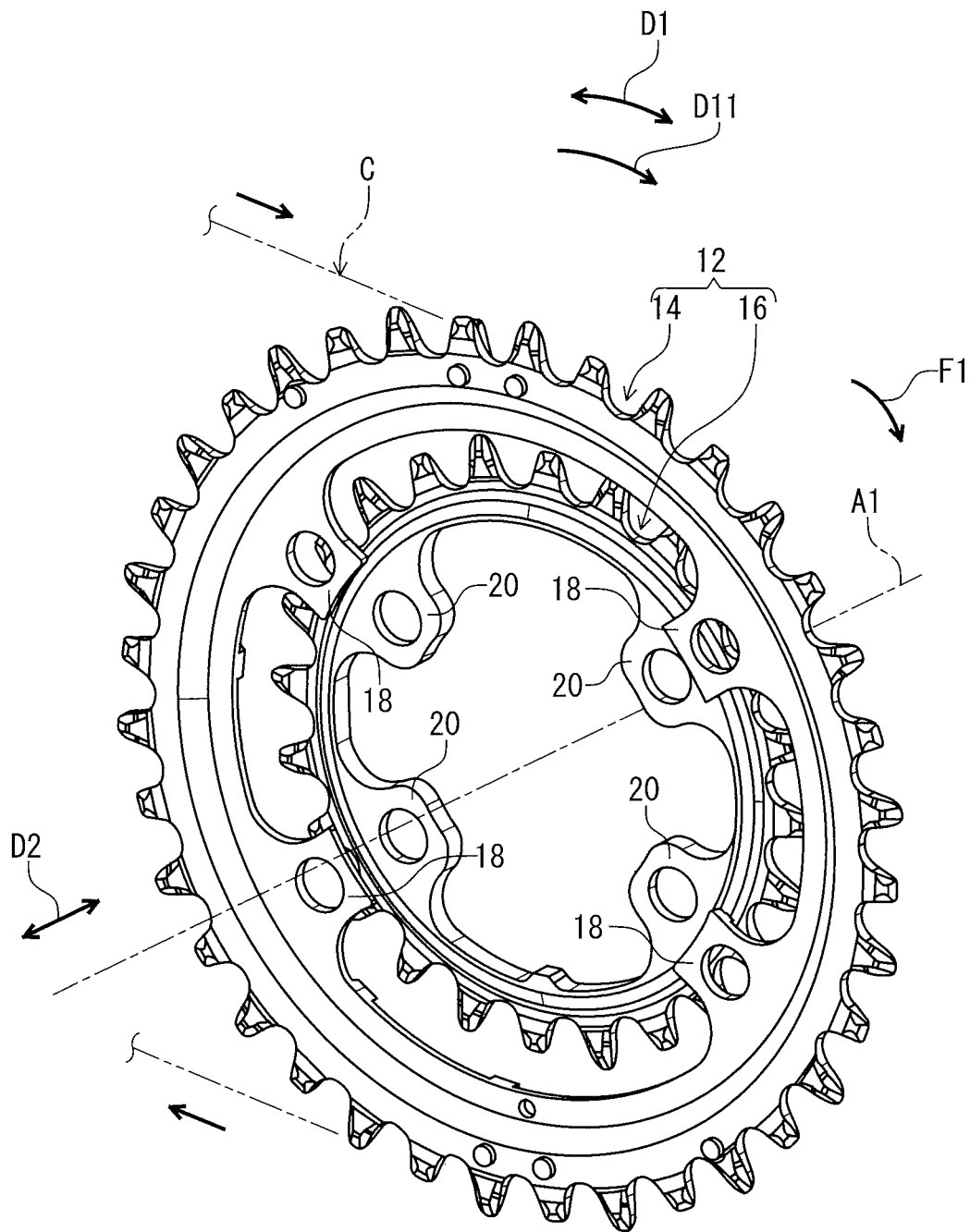
FIG. 3 is a perspective view of the bicycle sprocket assembly illustrated in FIG. 1.
Figure 4:
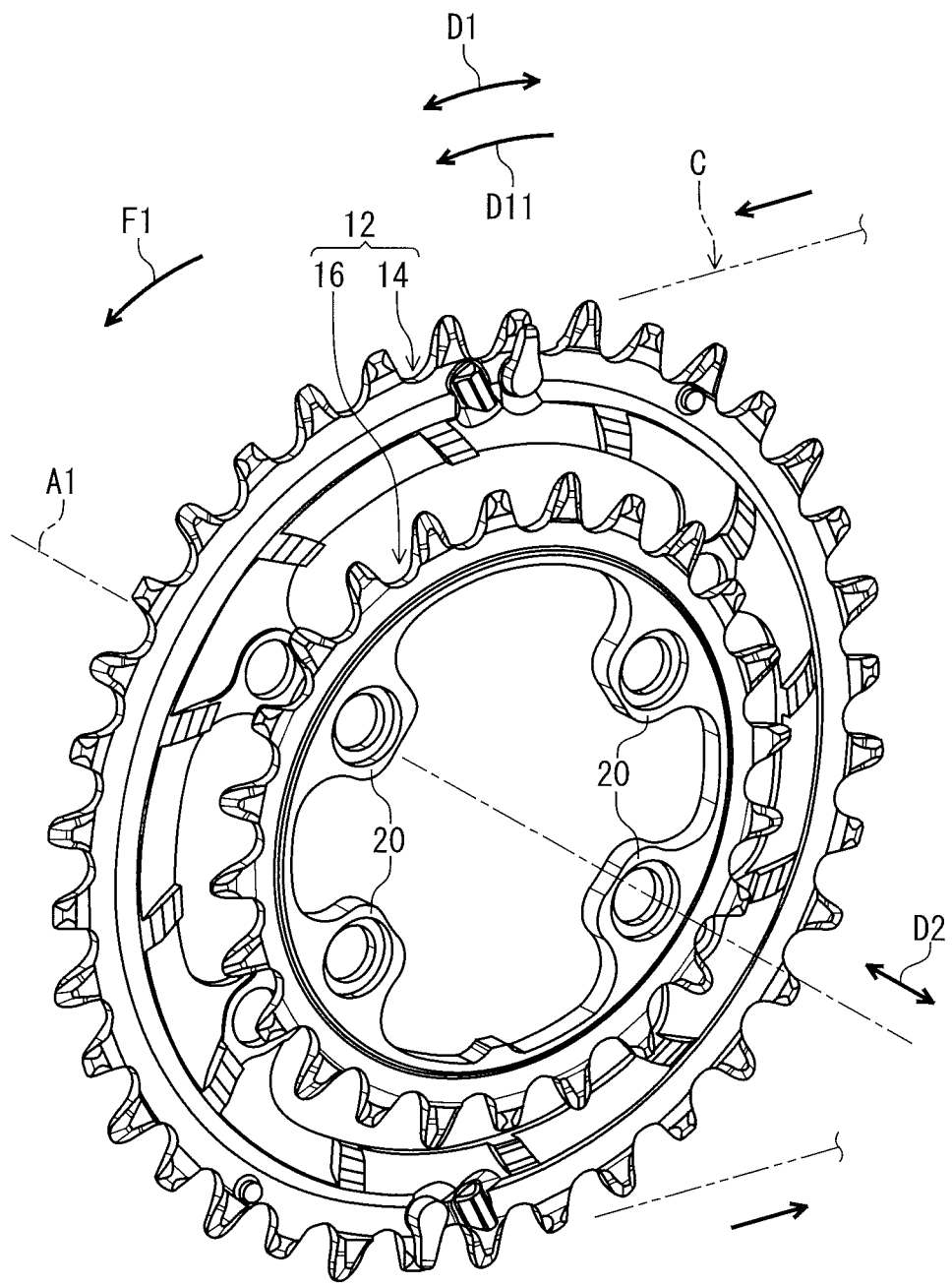
FIG. 4 is another perspective view of the bicycle sprocket assembly illustrated in FIG. 1.

As seen in FIGS. 3 and 4, the smaller sprocket 16 is adjacent to the bicycle sprocket 14 without another sprocket between the smaller sprocket 16 and the bicycle sprocket 14. The smaller sprocket 16 is adjacent to the bicycle sprocket 14 in an axial direction D2 parallel to the rotational center axis A1 without another sprocket between the smaller sprocket 16 and the bicycle sprocket 14. However, a total number of sprockets of the bicycle sprocket assembly 12 is not limited to this embodiment.

Figure 5:
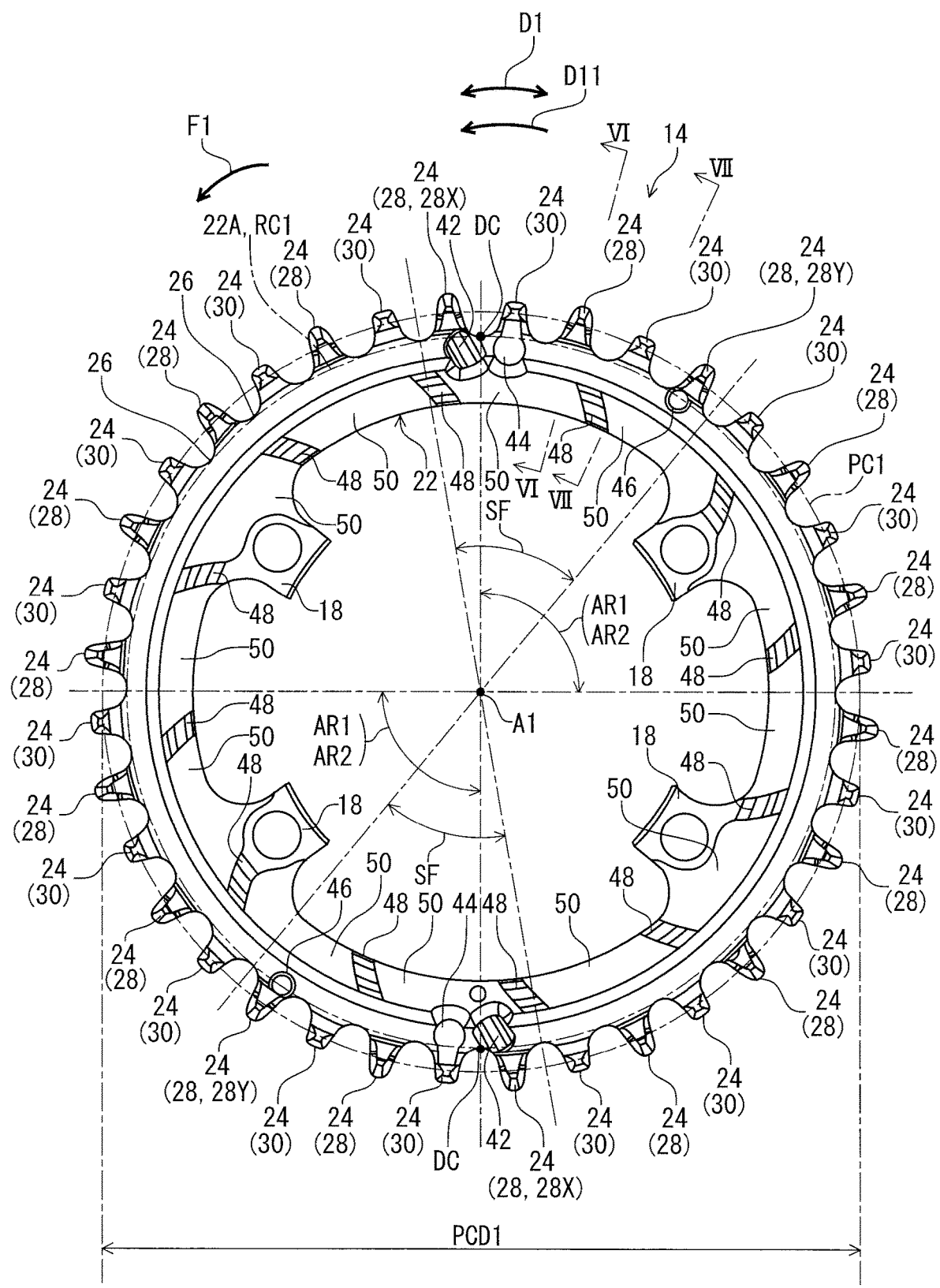
FIG. 5 is a side elevational view of a bicycle sprocket of the bicycle sprocket assembly illustrated in FIG. 3.

As seen in FIG. 5, the bicycle sprocket (the larger sprocket) 14 comprises a first sprocket body 22 and first sprocket teeth 24. The first sprocket teeth 24 extend radially outwardly from the first sprocket body 22. In this embodiment, the first sprocket body 22 includes a first outer periphery 22A provided about the rotational center axis A1 of the bicycle sprocket 14. The bicycle sprocket 14 includes first tooth bottoms 26 provided between the first sprocket teeth 24. The first tooth bottoms 26 define a first root circle RC1. The first outer periphery 22A is defined on the first root circle RC1. The first sprocket teeth 24 extend radially outwardly from the first outer periphery 22A. The first sprocket teeth 24 define the first pitch-circle diameter PCD1. The first sprocket teeth 24 include at least one first outer-link tooth 28 and at least one first inner-link tooth 30. In this embodiment, the at least one first outer-link tooth 28 includes first outer-link teeth 28. The at least one first inner-link tooth 30 includes first inner-link teeth 30. The first outer-link teeth 28 and the first inner-link teeth 30 are alternately arranged in the circumferential direction D1.

Figure 6:
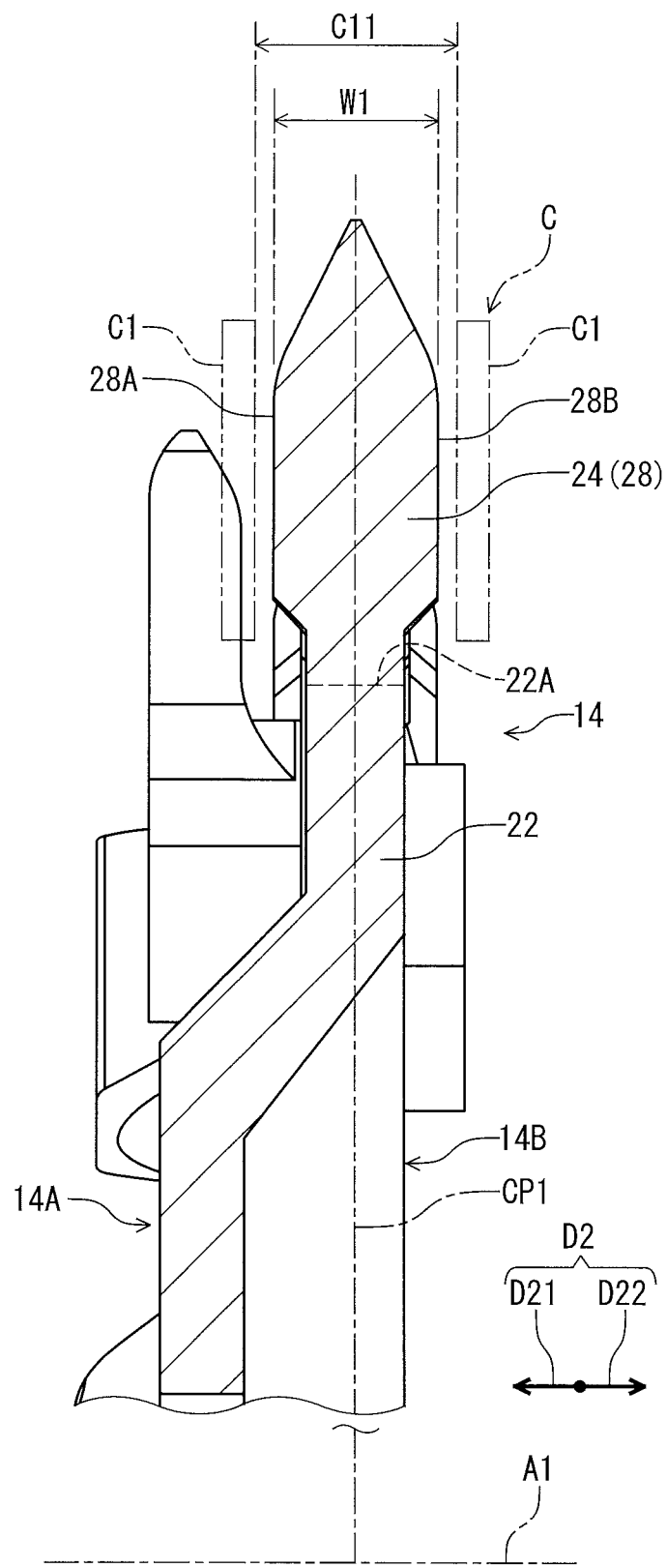
FIG. 6 is a cross-sectional view of the bicycle sprocket taken along line VI-VI of FIG. 5.

As seen in FIG. 6, the at least one first outer-link tooth 28 extends radially outwardly from the first sprocket body 22 to be received in only the outer link space C11. In this embodiment, the first outer-link teeth 28 extend radially outwardly from the first sprocket body 22 to be received in only the outer link space C11. The outer link space C11 is defined between an opposed pair of outer link plates C1 of the bicycle chain C.

The first outer-link tooth 28 has a first maximum axial width W1 defined in the axial direction D2. The first outer-link tooth 28 includes a first axial surface 28A and a first axial reverse surface 28B. The first axial surface 28A faces in the axial direction D2. The first axial reverse surface 28B faces in the axial direction D2 and is provided on a reverse side of the first axial surface 28A. The first maximum axial width W1 is defined between the first axial surface 28A and the first axial reverse surface 28B in the axial direction D2.

The first outer-link tooth 28 has a first center plane CP1 defined to bisect the first maximum axial width W1 in the axial direction D2. The first center plane CP1 is perpendicular to the rotational center axis A1.

Figure 7:
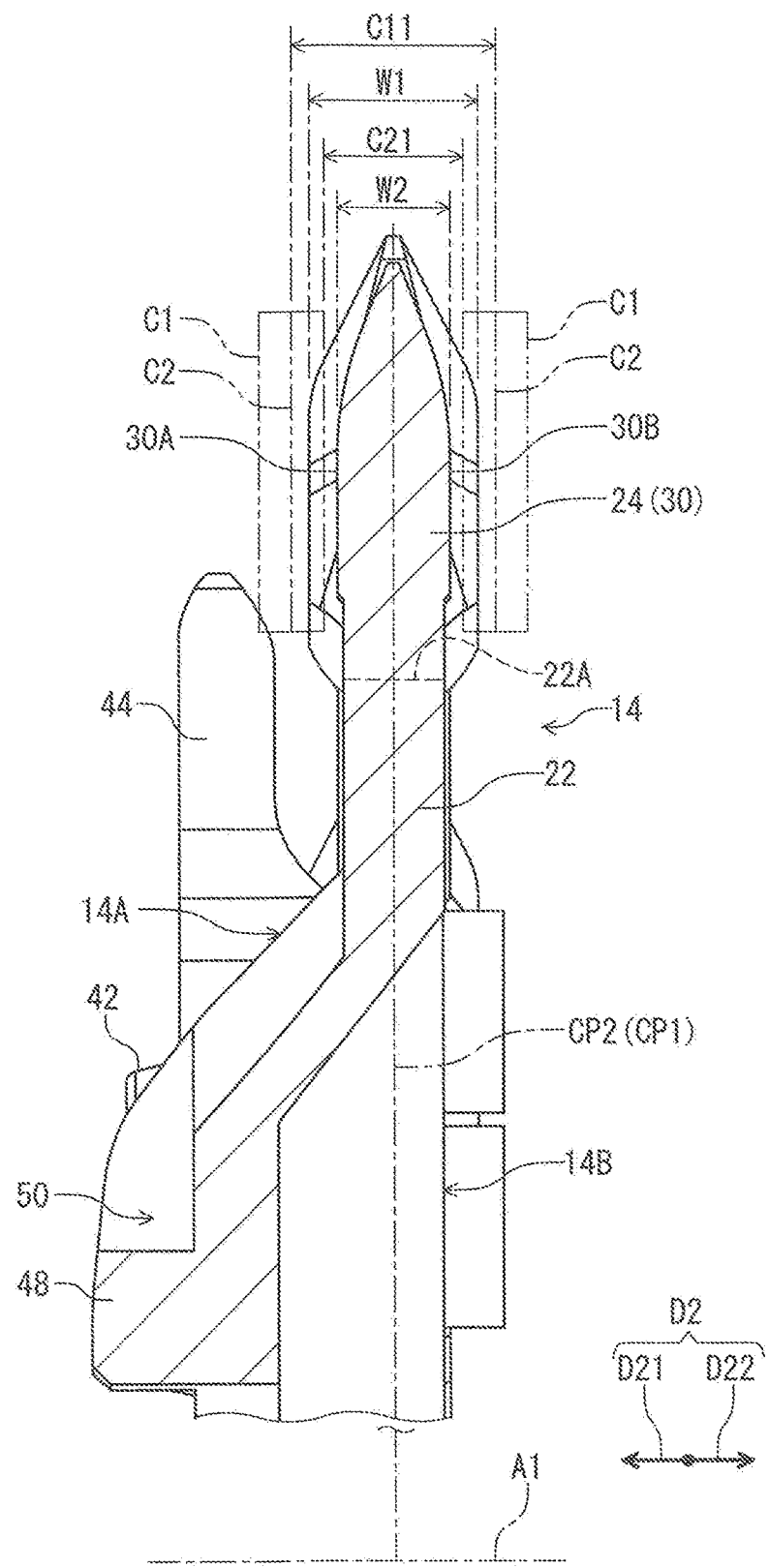
FIG. 7 is a cross-sectional view of the bicycle sprocket taken along line VII-VII of FIG. 5.

As seen in FIG. 7, the at least one first inner-link tooth 30 extends radially outwardly from the first sprocket body 22 to be received in only the inner link space C21. In this embodiment, the first inner-link teeth 30 extend radially outwardly from the first sprocket body 22 to be received in only the inner link space C21. The inner link space C21 is defined between an opposed pair of inner link plates C2 of the bicycle chain C.

The first inner-link tooth 30 has a second maximum axial width W2 defined in the axial direction D2. The first inner-link tooth 30 includes a second axial surface 30A and a second axial reverse surface 30B. The second axial surface 30A faces in the axial direction D2. The second axial reverse surface 30B faces in the axial direction D2 and is provided on a reverse side of the second axial surface 30A. The second maximum axial width W2 is defined between the second axial surface 30A and the second axial reverse surface 30B in the axial direction D2.

The first inner-link tooth 30 has a second center plane CP2 defined to bisect the second maximum axial width W2 in the axial direction D2. The second center plane CP2 is perpendicular to the rotational center axis A1. In this embodiment, the second center plane CP2 coincides with the first center plane CP1. However, the second center plane CP2 can be offset from the first center plane CP1 in the axial direction D2.

As seen in FIG. 7, the first maximum axial width W1 is larger than the second maximum axial width W2. The first maximum axial width W1 is smaller than an axial width of an outer link space C11 and is larger than an axial width of an inner link space C21. The second maximum axial width W2 is smaller than the axial width of the inner link space C21.

The structures of the first outer-link tooth 28 and the first inner-link tooth 30 are not limited to this embodiment. At least one of the first outer-link tooth 28 and the first inner-link tooth 30 can have other shapes such as a twisted shape or a curved shape.

As seen in FIGS. 6 and 7, the bicycle sprocket (the larger sprocket) 14 comprises a first side surface 14A and a second side surface 14B. The first side surface 14A is provided on the first sprocket body 22. The first side surface 14A faces in the axial direction D2 of the rotational center axis A1 of the bicycle sprocket 14. The first side surface 14A faces toward a first side D21 of the axial direction D2 of the rotational center axis A1 of the bicycle sprocket 14. The first side surface 14A faces toward the smaller sprocket 16 in the axial direction D2. The second side surface 14B is provided on the first sprocket body 22. The second side surface 14B faces in the axial direction D2. The second side surface 14B faces toward a second side D22 of the axial direction D2 reverse to the first side D21. The second side surface 14B is provided on a reverse side of the first side surface 14A in the axial direction D2.

Figure 8:
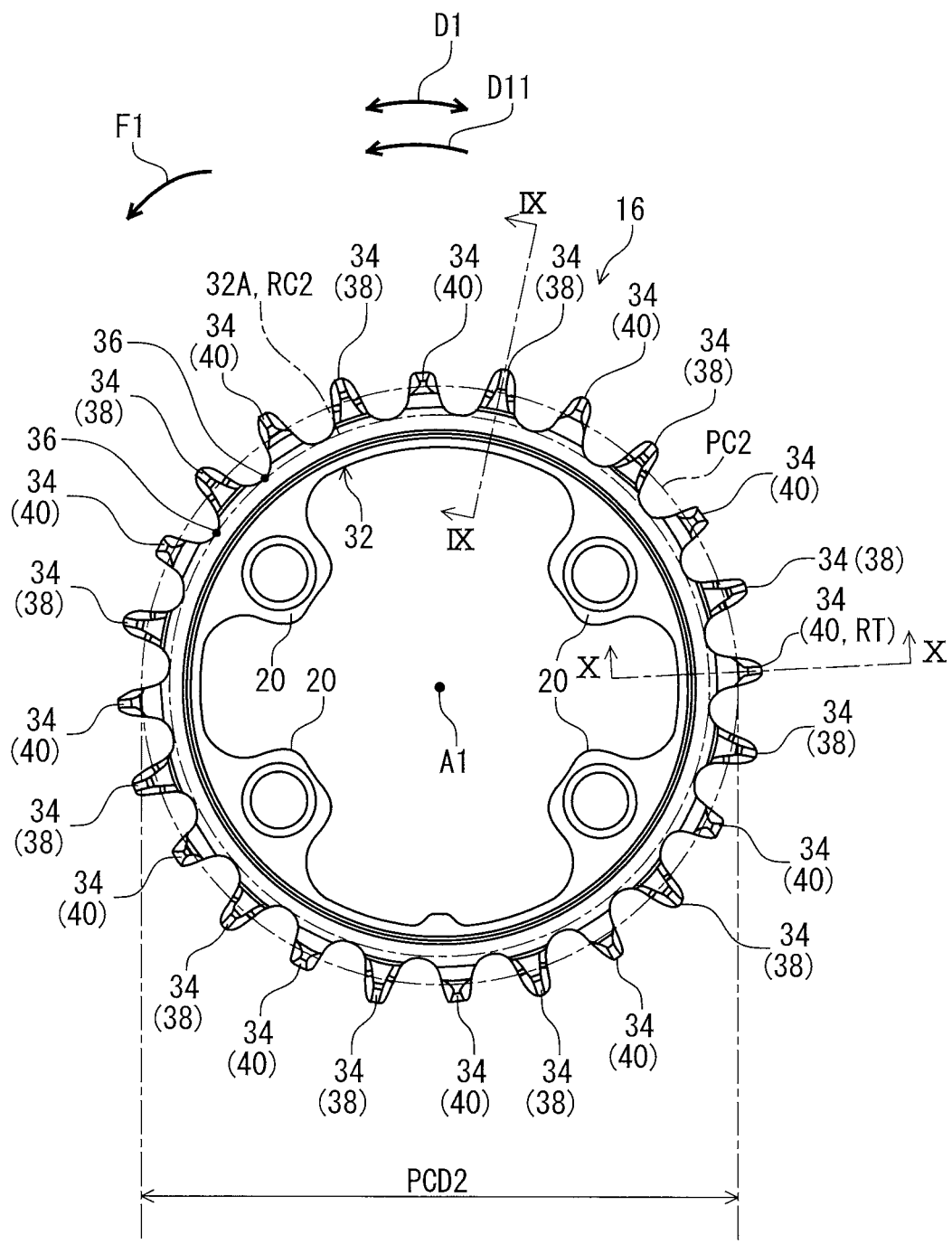
FIG. 8 is a side elevational view of a smaller sprocket of the bicycle sprocket assembly illustrated in FIG. 3.

As seen in FIG. 8, the smaller sprocket 16 comprises a second sprocket body 32 and second sprocket teeth 34. The second sprocket teeth 34 extend radially outwardly from the second sprocket body 32. The second sprocket body 32 includes a second outer periphery 32A provided about the rotational center axis A1 of the smaller sprocket 16. The smaller sprocket 16 includes second tooth bottoms 36 provided between the second sprocket teeth 34. The second tooth bottoms 36 define a second root circle RC2. The second outer periphery 32A is defined on the second root circle RC2. The second sprocket teeth 34 extend radially outwardly from the second outer periphery 32A. The second sprocket teeth 34 define the second pitch-circle diameter PCD2. The second sprocket teeth 34 include at least one outer-link tooth 38 and at least one inner-link tooth 40. In this embodiment, the at least one outer-link tooth 38 includes outer-link teeth 38. The at least one inner-link tooth 40 includes inner-link teeth 40. The outer-link teeth 38 and the inner-link teeth 40 are alternately arranged in the circumferential direction D1. The outer-link tooth 38 can also be referred to as the second outer-link tooth 38. The inner-link tooth 40 can also be referred to as the second inner-link tooth 40. As seen in FIGS. 5 and 8, a total number of the first sprocket teeth 24 is larger than a total number of the second sprocket teeth 34.

Figure 9:
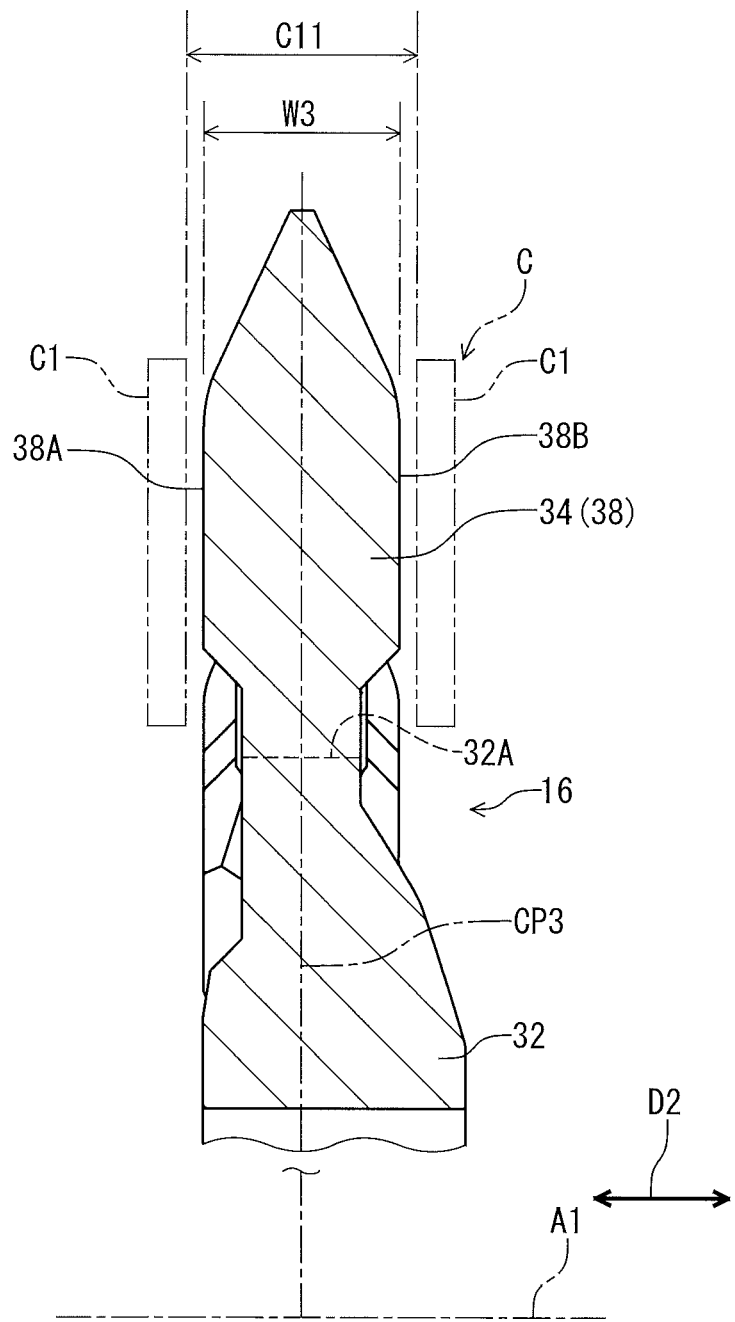
FIG. 9 is a cross-sectional view of the smaller sprocket taken along line IX-IX of FIG. 8.

As seen in FIG. 9, the at least one outer-link tooth 38 extends radially outwardly from the second sprocket body 32 to be received in only the outer link space C11. In this embodiment, the outer-link teeth 38 each extend radially outwardly from the second sprocket body 32 to be received in only the outer link space C11.

The at least one outer-link tooth 38 has a larger maximum axial width W3 defined in the axial direction D2. The outer-link tooth 38 includes a third axial surface 38A and a third axial reverse surface 38B. The third axial surface 38A faces in the axial direction D2. The third axial reverse surface 38B faces in the axial direction D2 and is provided on a reverse side of the third axial surface 38A. The larger maximum axial width W3 is defined between the third axial surface 38A and the third axial reverse surface 38B in the axial direction D2.

The outer-link tooth 38 has a third center plane CP3 defined to bisect the larger maximum axial width W3 in the axial direction D2. The third center plane CP3 is perpendicular to the rotational center axis A1.

Figure 10:
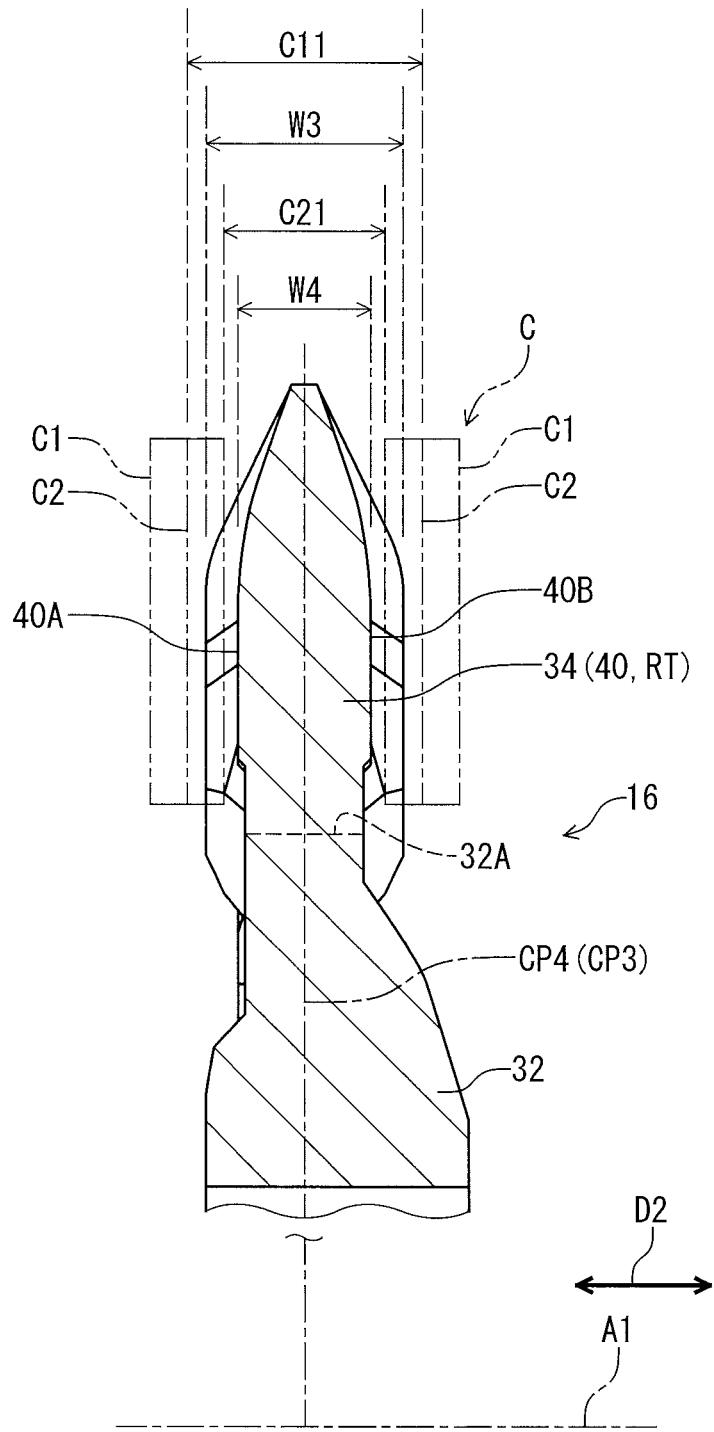
FIG. 10 is a cross-sectional view of the smaller sprocket taken along line X-X of FIG. 8.

As seen in FIG. 10, the at least one inner-link tooth 40 extends radially outwardly from the second sprocket body 32 to be received in only the inner link space C21. In this embodiment, the inner-link teeth (second inner-link teeth) 40 each extend radially outwardly from the second sprocket body 32 to be received in only the inner link space C21.

The at least one inner-link tooth 40 has a smaller maximum axial width W4 defined in the axial direction D2. The inner-link tooth 40 includes a fourth axial surface 40A and a fourth axial reverse surface 40B. The fourth axial surface 40A faces in the axial direction D2. The fourth axial reverse surface 40B faces in the axial direction D2 and is provided on a reverse side of the fourth axial surface 40A. The smaller maximum axial width W4 is defined between the fourth axial surface 40A and the fourth axial reverse surface 40B in the axial direction D2.

The inner-link tooth 40 has a fourth center plane CP4 defined to bisect the smaller maximum axial width W4 in the axial direction D2. The fourth center plane CP4 is perpendicular to the rotational center axis A1. In this embodiment, the fourth center plane CP4 coincides with the third center plane CP3. However, the fourth center plane CP4 can be offset from the third center plane CP3 in the axial direction D2.

As seen in FIG. 10, the larger maximum axial width W3 is larger than the smaller maximum axial width W4. The larger maximum axial width W3 is smaller than the axial width of the outer link space C11 and is larger than the axial width of the inner link space C21. The smaller maximum axial width W4 is smaller than the axial width of the inner link space C21. However, the dimensional relationship among the above widths is not limited to this embodiment. The larger maximum axial width W3 can also be referred to as the third maximum axial width W3. The smaller maximum axial width W4 can also be referred to as the fourth maximum axial width W4.

As seen in FIG. 8, the second sprocket teeth 34 include a reference tooth RT. Namely, the smaller sprocket 16 includes the reference tooth RT. In this embodiment, one of the inner-link teeth 40 corresponds to the reference tooth RT. However, each of the inner-link teeth 40 can correspond to the reference tooth RT. As seen in FIG. 10, the reference tooth RT has a maximum axial width (the smaller maximum axial width) W4 defined in the axial direction D2. The reference tooth RT has the tooth-center plane (the fourth center plane) CP4 defined to bisect the maximum axial width W4.

The structures of the outer-link tooth 38 and the inner-link tooth 40 are not limited to this embodiment. At least one of the outer-link tooth 38 and the inner-link tooth 40 can have other shapes such as a twisted shape or a curved shape. For example, outer-link teeth engageable with the outer link space C11 can be offset from inner-link teeth engageable with the inner link space C21 in the axial direction D2. The outer-link teeth and the inner-link teeth are alternately arranged in the circumferential direction D1. In such an embodiment, a maximum axial width of the outer-link teeth can be equal to a maximum axial width of the inner-link teeth.

Figure 11:
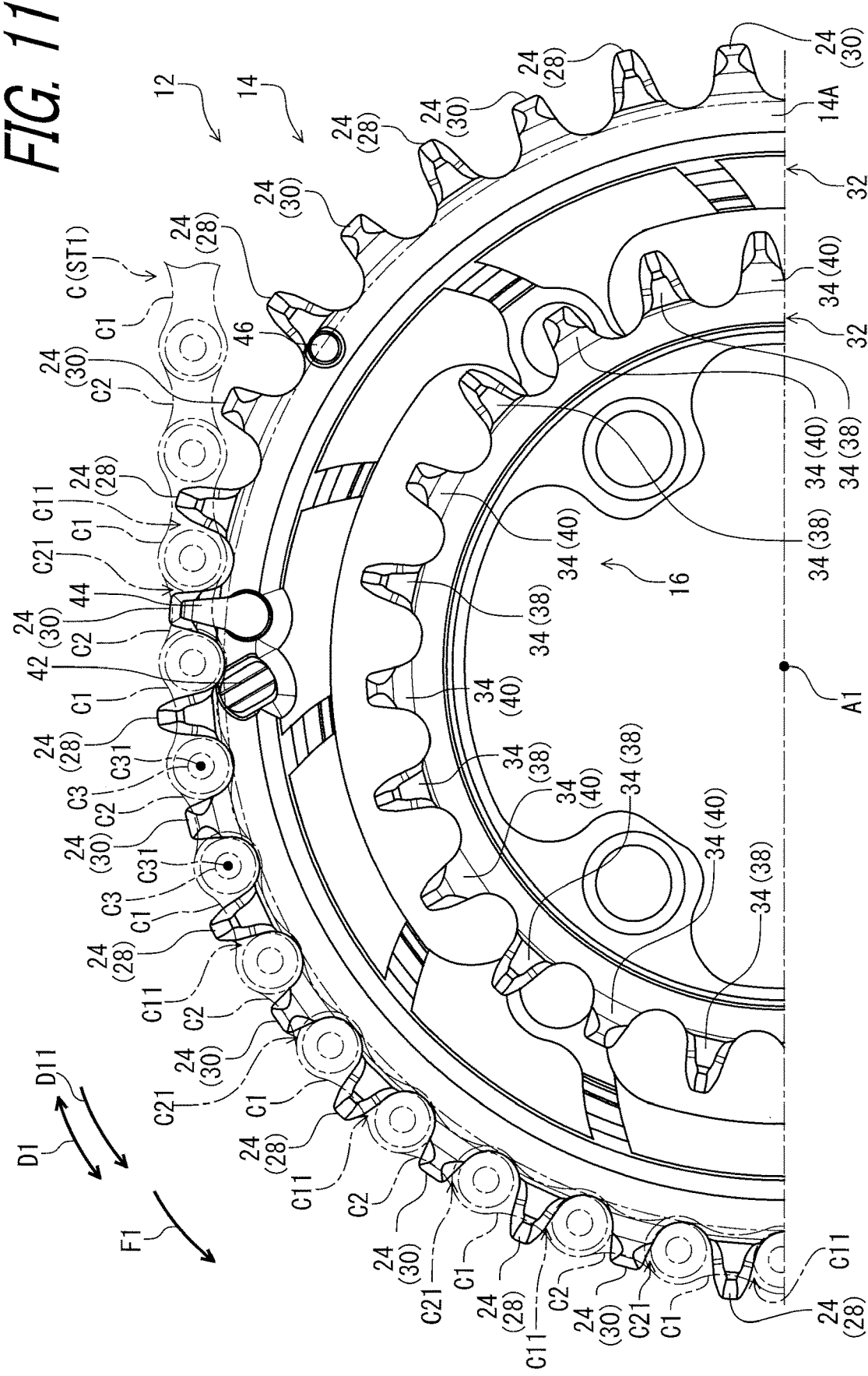
FIG. 11 is a partial side elevational view of the bicycle sprocket assembly illustrated in FIG. 3 with a bicycle chain (first chain-phase state).

As seen in FIG. 11, the first sprocket teeth 24 extend radially outwardly from the first sprocket body 22 to define a first chain-phase state ST1 where at least one of the first sprocket teeth 24 is received in only one of the inner link space C21 and the outer link space C11. In the first chain-phase state ST1, the first outer-link tooth 28 is configured to be received in the outer link space C11, and the first inner-link tooth 30 is configured to be received in the inner link space C21.

Figure 12:
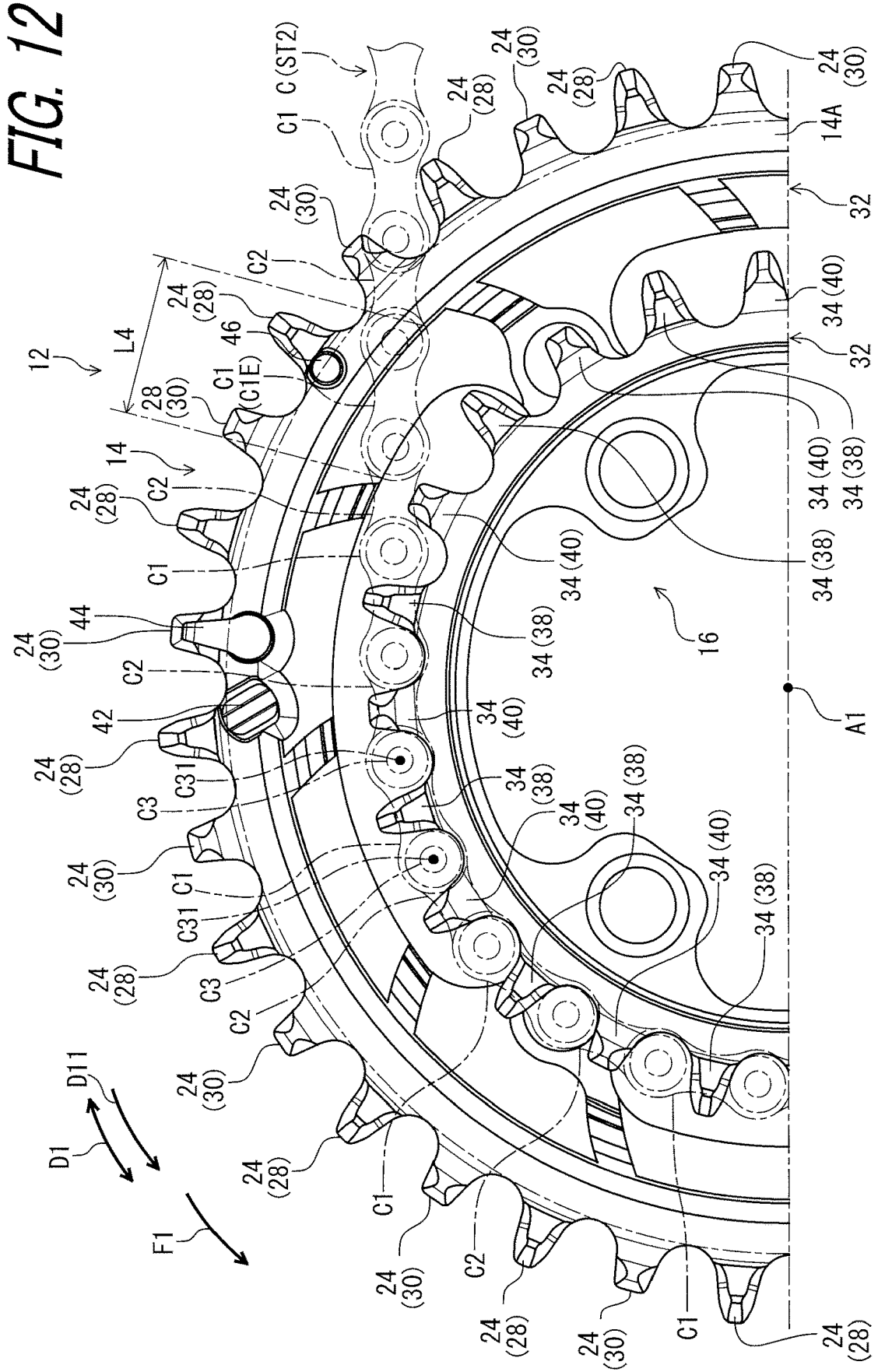
FIG. 12 is a partial side elevational view of the bicycle sprocket assembly illustrated in FIG. 3 with the bicycle chain (second chain-phase state).

As seen in FIG. 12, the second sprocket teeth 34 extend radially outwardly from the second sprocket body 32 to define a second chain-phase state (a chain-phase state) ST2 where at least one of the second sprocket teeth 34 is received in only one of the inner link space C21 and the outer link space C11. In the second chain-phase state ST2, the outer-link tooth 38 is configured to be received in the outer link space C11, and the inner-link tooth 40 is configured to be received in the inner link space C21.

Figure 13:
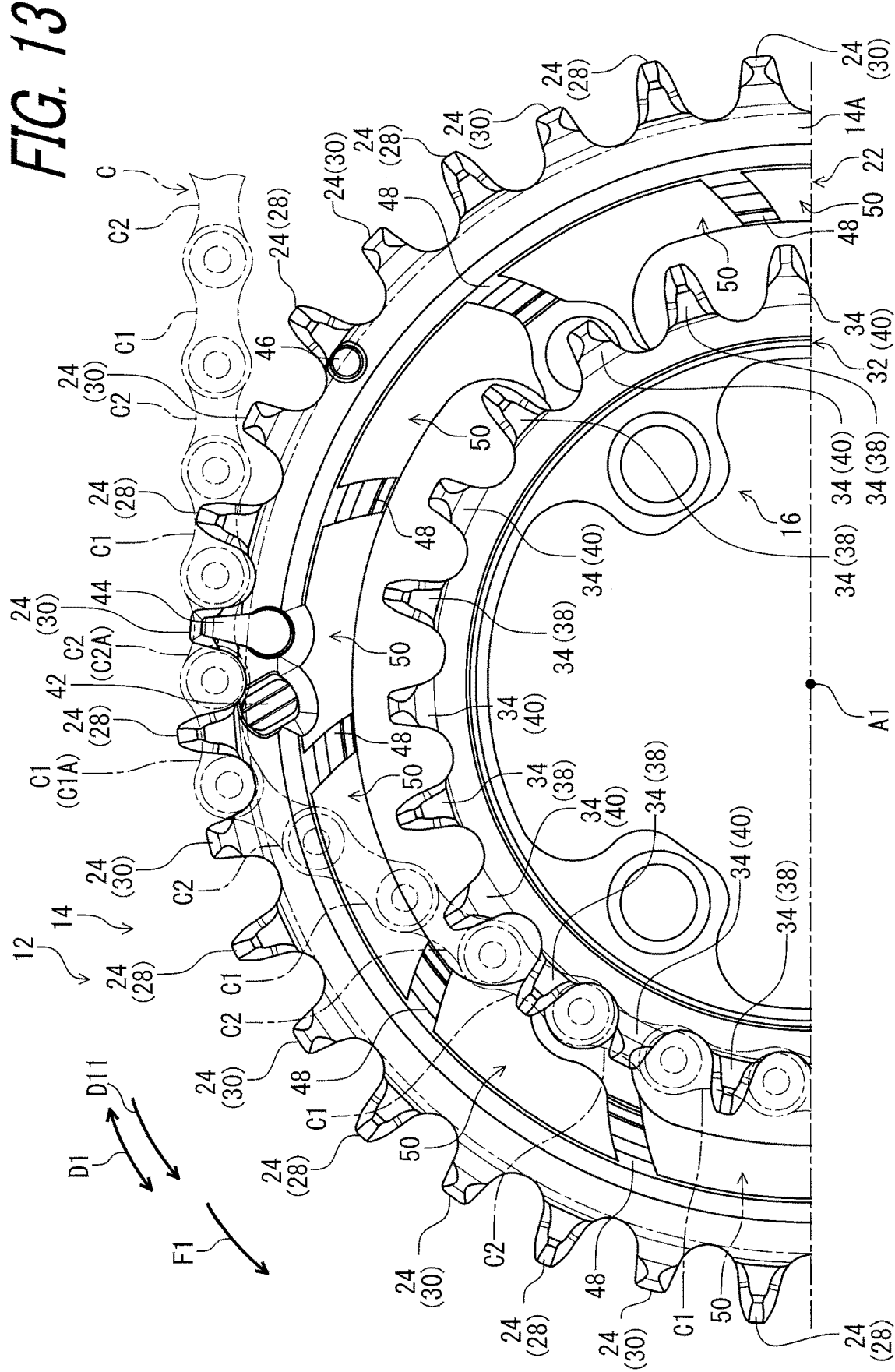
FIG. 13 is a partial side elevational view of the bicycle sprocket assembly illustrated in FIG. 3 with the bicycle chain (first shifting operation).

As seen in FIG. 13, the bicycle sprocket 14 comprises at least one shifting facilitation projection 42 configured to facilitate a first shifting operation in which the bicycle chain C is shifted from the smaller sprocket 16 to the bicycle sprocket 14. The shifting facilitation projection 42 is provided on the first side surface 14A to lift the outer link plate C1A in the first shifting operation. In this embodiment, the shifting facilitation projection 42 is secured to the first sprocket body 22 with a fastening structure such as a rivet.

The bicycle sprocket 14 comprises at least one shifting facilitation member 44 configured to facilitate the first shifting operation. The shifting facilitation member 44 is provided on the first side surface 14A to move the inner link plate C2A toward the bicycle sprocket 14 in the first shifting operation. In this embodiment, the shifting facilitation member 44 is secured to the first sprocket body 22 with a fastening structure such as a rivet.

Figure 14:
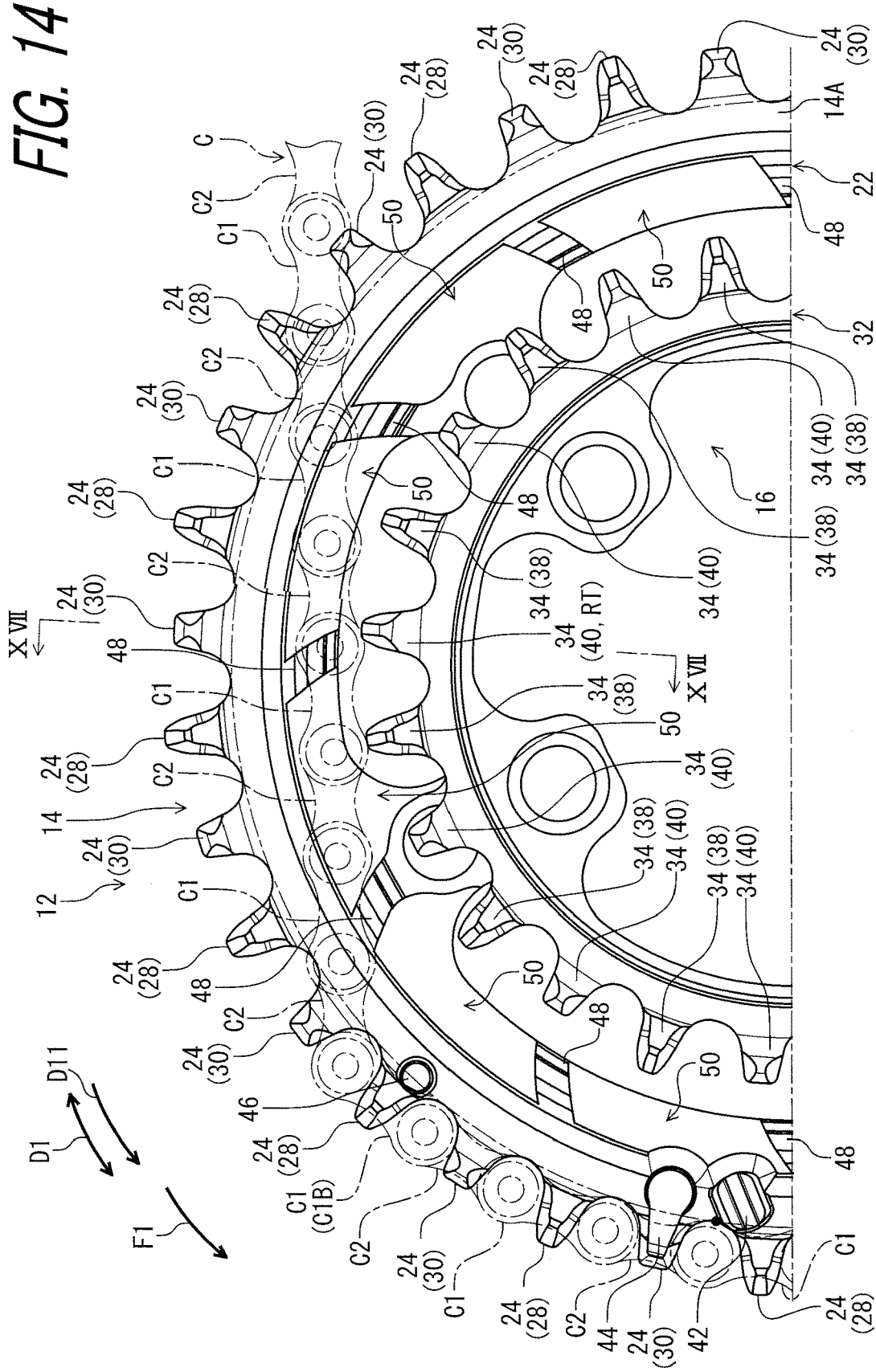
FIG. 14 is a partial side elevational view of the bicycle sprocket assembly illustrated in FIG. 3 with the bicycle chain (second shifting operation).

As seen in FIG. 14, the bicycle sprocket 14 further comprises an additional shifting facilitation projection 46 provided on the first side surface 14A to facilitate a second shifting operation in which the bicycle chain C is shifted from the bicycle sprocket 14 to the smaller sprocket 16. The additional shifting facilitation projection 46 is configured to engage with the outer link plate C1B to adjust a chain phase of the bicycle chain C for the smaller sprocket 16. In this embodiment, the additional shifting facilitation projection 46 is secured to the first sprocket body 22 with a fastening structure such as a rivet.

As seen in FIG. 5, the bicycle sprocket 14 comprises a pair of shifting facilitation projections 42. The bicycle sprocket 14 comprises a pair of shifting facilitation members 44. The bicycle sprocket 14 comprises a pair of additional shifting facilitation projections 46. However, a total number of the shifting facilitation projections 42 is not limited to this embodiment. A total number of the shifting facilitation members 44 is not limited to this embodiment. A total number of the additional shifting facilitation projections 46 is not limited to this embodiment. At least one of the shifting facilitation projection 42, the shifting facilitation member 44, and the additional shifting facilitation projection 46 can be omitted from the bicycle sprocket 14.

Figure 15:
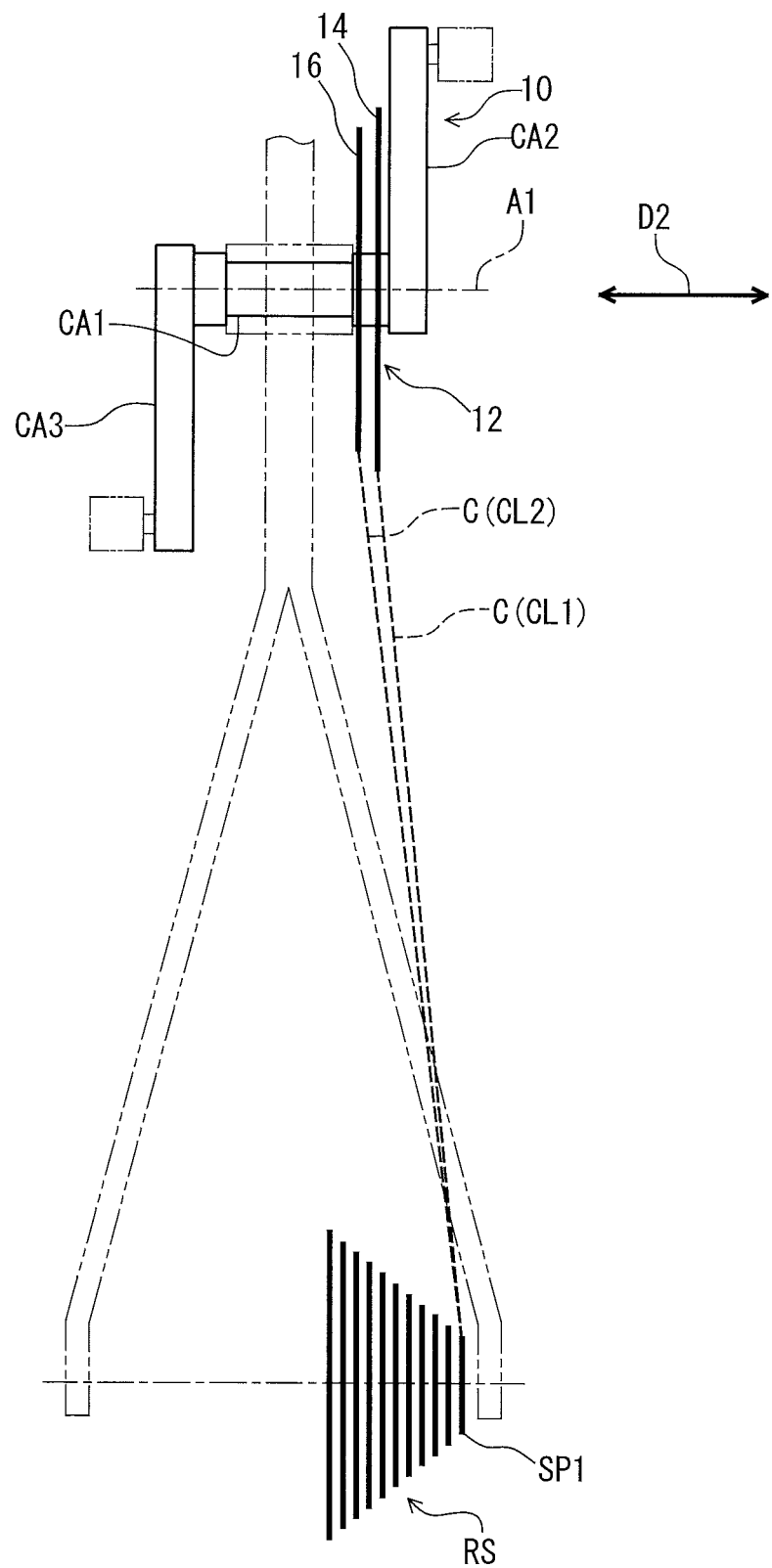
FIG. 15 is a schematic diagram of a bicycle drive train including the bicycle crank assembly illustrated in FIG. 1 with the bicycle chain.

As seen in FIG. 15, the bicycle chain C extends between the bicycle sprocket assembly 12 and a rear sprocket assembly RS. A first chain line CL1 is defined along the bicycle chain C engaged with the bicycle sprocket 14 and a rear sprocket SP1. A second chain line CL2 is defined by the bicycle chain C engaged with the smaller sprocket 16 and the rear sprocket SP1. The rear sprocket SP1 corresponds to a top gear of the rear sprocket assembly RS and is disposed at an outermost axial position in the rear sprocket assembly RS. The first chain line CL1 is likely to apply a resistance force to the bicycle chain C against the second shifting operation in which the bicycle chain C is shifted from the bicycle sprocket 14 to the smaller sprocket 16.

Figure 16:
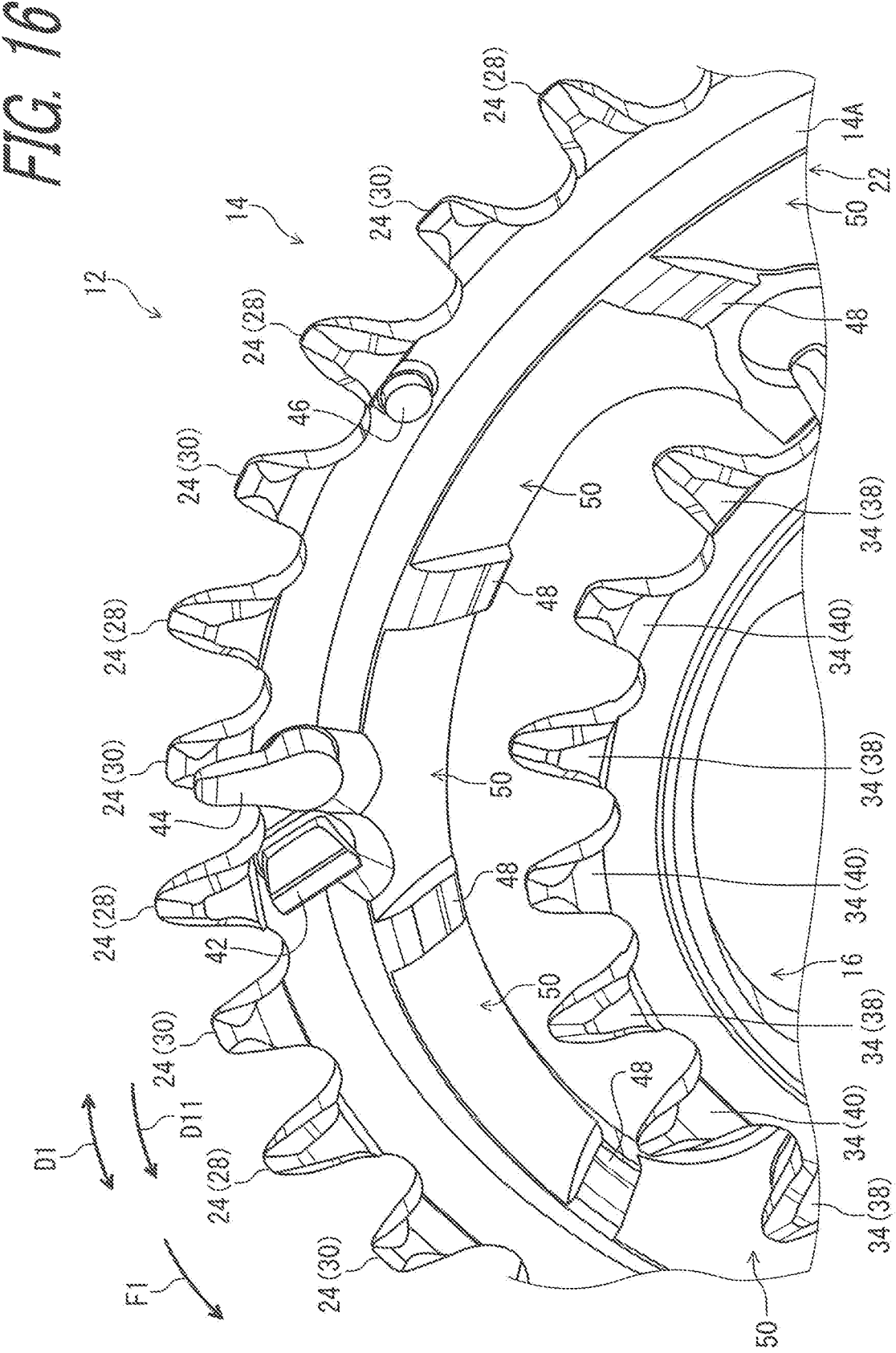
FIG. 16 is a partial perspective view of the bicycle sprocket assembly illustrated in FIG. 3.
Figure 17:
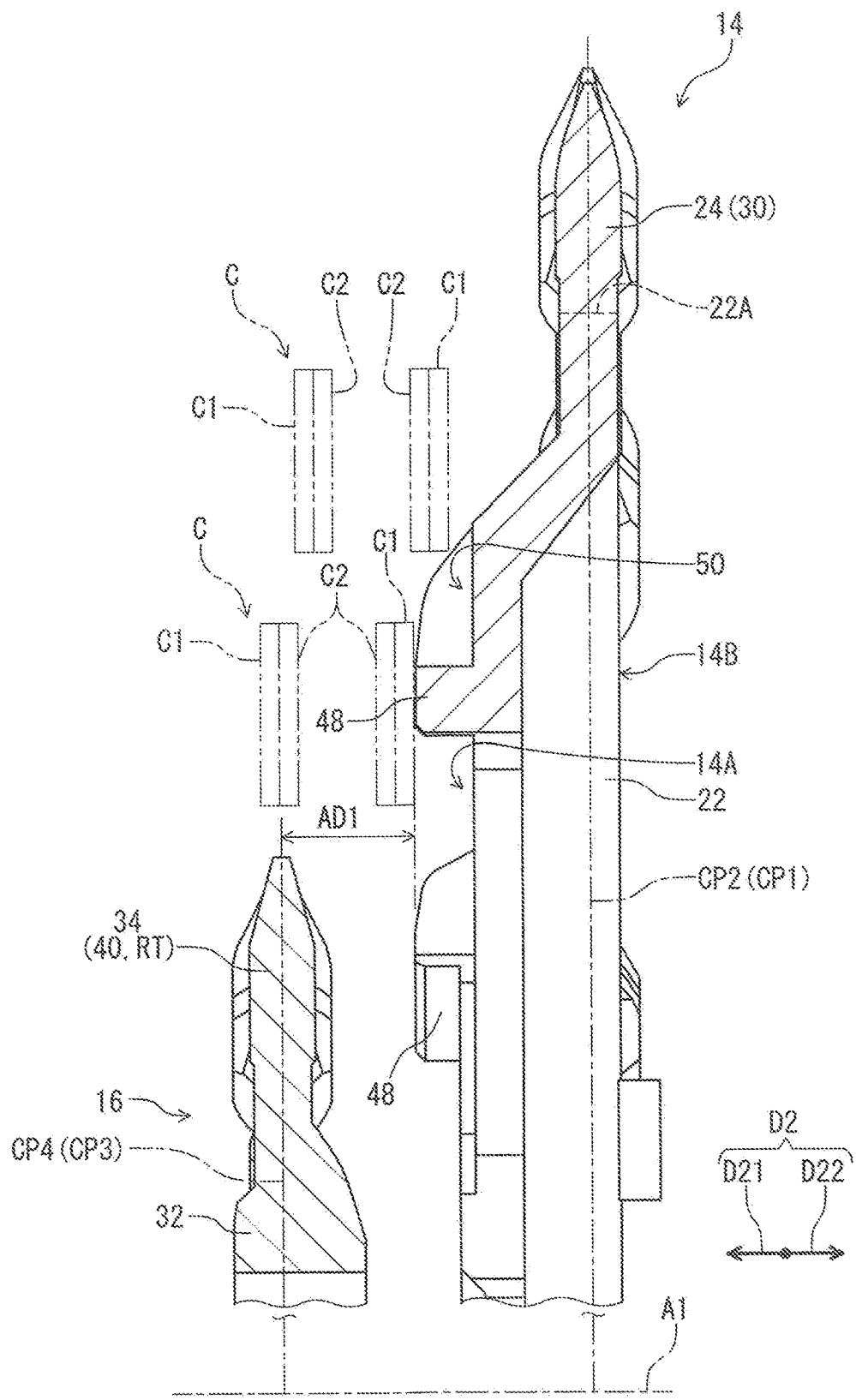
FIG. 17 is a cross-sectional view of the bicycle sprocket assembly taken along line XVII-XVII of FIG. 14.

As seen in FIGS. 16 and 17, the bicycle sprocket 14 comprises at least one guide portion 48 provided on the first side surface 14A to guide the bicycle chain C from the bicycle sprocket 14 toward the smaller sprocket 16 in the second shifting operation in which the bicycle chain C is shifted from the bicycle sprocket 14 to the smaller sprocket 16. This smoothens the second shifting operation even in a state where the bicycle chain C extends along the first chain line CL1 (FIG. 15).

As seen in FIGS. 14 and 17, the at least one guide portion 48 includes guide portions 48 each provided on the first side surface 14A to guide the bicycle chain C from the bicycle sprocket 14 toward the smaller sprocket 16 in the second shifting operation. In this embodiment, as seen in FIG. 14, the first sprocket body 22 includes the at least one guide portion 48. Specifically, the first sprocket body 22 includes guide portions 48 provided on the first side surface 14A to guide the bicycle chain C from the bicycle sprocket 14 toward the smaller sprocket 16 in a shifting operation in which the bicycle chain C is shifted from the bicycle sprocket 14 to the smaller sprocket 16. In this embodiment, as seen in FIG. 5, a total number of the guide portions 48 is 12. As seen in FIG. 8, a total number of the second sprocket teeth 34 is 24. Namely, the total number of the guide portions 48 is a half of the total number of the second sprocket teeth 34. However, the total number of the guide portions 48 is not limited to this embodiment. For example, the total number of the guide portions 48 can be different from a half of the total number of the second sprocket teeth 34.

As seen in FIGS. 14 and 16, the bicycle sprocket 14 comprises at least one recess 50 provided on the first side surface 14A so as to be adjacent to the at least one guide portion 48 in the circumferential direction D1 defined about the rotational center axis A1. The at least one recess 50 is provided between adjacent two of the guide portions 48 in the circumferential direction D1. In this embodiment, the at least one recess 50 includes recesses 50 provided on the first side surface 14A to reduce interference between the bicycle sprocket 14 and the bicycle chain C. The recess 50 is provided on the first side surface 14A to reduce interference between the bicycle sprocket 14 and the outer link plates C1 in the second chain-phase state ST2. The recess 50 reduces interference between the bicycle sprocket 14 and the bicycle chain C even in a state where the bicycle chain C extends along the second chain line CL2. The recesses 50 and the guide portions 48 are alternately arranged in the circumferential direction D1. The guide portions 48 define the at least one recess 50 therebetween. However, a total number of the recesses 50 is not limited to this embodiment.

Figure 18:
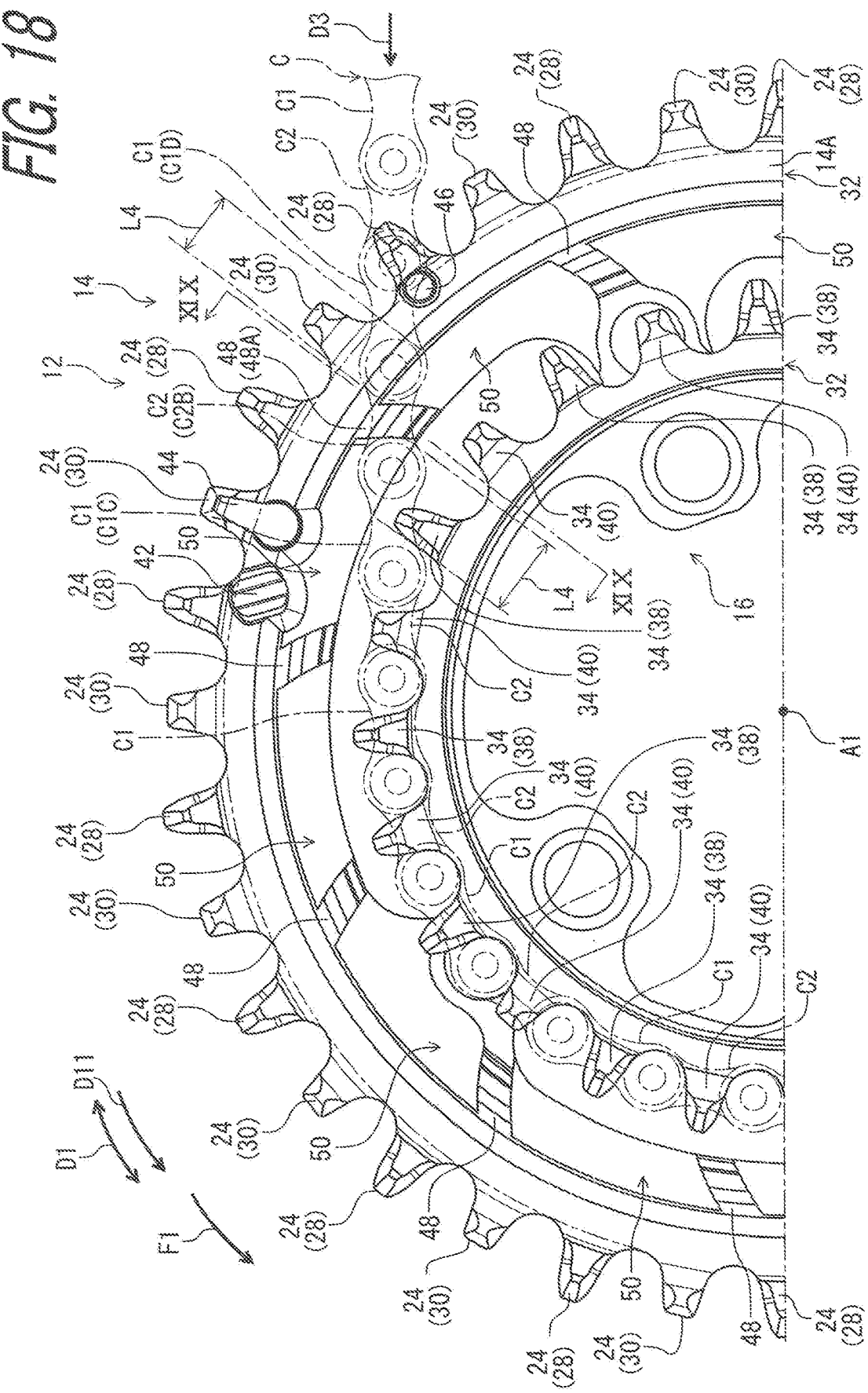
FIG. 18 is a partial side elevational view of the bicycle sprocket assembly illustrated in FIG. 3 with the bicycle chain (second chain-phase state).
Figure 19:
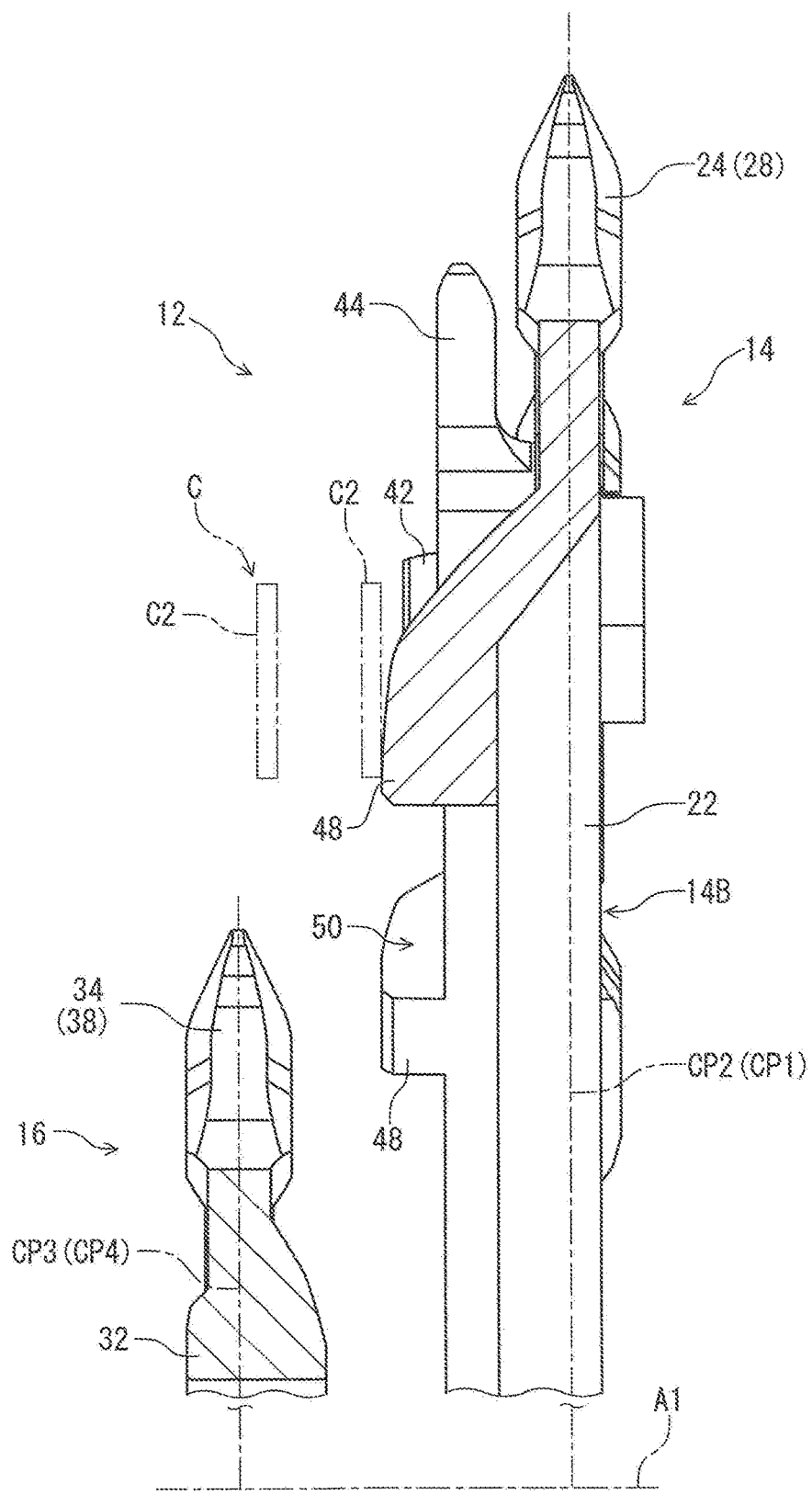
FIG. 19 is a cross-sectional view of the bicycle sprocket assembly taken along line XIX-XIX of FIG. 18.

As seen in FIGS. 18 and 19, the at least one guide portion 48 is provided on the first side surface 14A to face the inner link plate C2B of the bicycle chain C in the axial direction D2 in a state where the bicycle chain C is engaged with the smaller sprocket 16 to transmit the pedaling force F1 between the smaller sprocket 16 and the bicycle chain C. As seen in FIG. 18, the at least one guide portion 48 (e.g., the guide portion 48A) is configured to be provided between adjacent outer link plates C1C and C1D of the bicycle chain C in a chain running direction D3 in the state where the bicycle chain C is engaged with the smaller sprocket 16 to transmit the pedaling force F1 between the smaller sprocket 16 and the bicycle chain C. In other words, the at least one guide portion 48 is provided between the adjacent outer link plates C1C and C1D of the bicycle chain C as viewed from the axial direction D2 of the rotational center axis A1.

As seen in FIG. 18, the at least one recess 50 is provided on the first side surface 14A to face a portion of the outer link plate C1 (e.g., C1C, C1D, or C1E (FIG. 12)) of the bicycle chain C in the axial direction D2 in a state where the bicycle chain C is engaged with the smaller sprocket 16 to transmit the pedaling force F1 between the smaller sprocket 16 and the bicycle chain C. The at least one recess 50 is provided on the first side surface 14A to reduce interference between the bicycle sprocket 14 and the bicycle chain C. In this embodiment, each of the recesses 50 is provided on the first side surface 14A to face the portion of the outer link plate C1 (e.g., C1C, C1D, or C1E (FIG. 12)) of the bicycle chain C in the axial direction D2 in the state where the bicycle chain C is engaged with the smaller sprocket 16 to transmit the pedaling force F1 between the smaller sprocket 16 and the bicycle chain C. Each of the recesses 50 is provided on the first side surface 14A to reduce interference between the bicycle sprocket 14 and the bicycle chain C in the driving state.

As seen in FIG. 5, at least one of the at least one recess 50 is provided in an upstream angular area AR1 defined from the at least one shifting facilitation projection 42 to an upstream side in a driving state where the bicycle sprocket 14 is rotated about the rotational center axis A1 during pedaling and within 90 degrees in the circumferential direction D1. In this embodiment, four of the recesses 50 are at least partly provided in the upstream angular area AR1. Two of the recesses 50 are entirely provided in the upstream angular area AR1. However, a total number of the recesses 50 provided in the upstream angular area AR1 is not limited to this embodiment.

At least one of the at least one recess 50 is provided in an upstream angular range AR2 defined from a dead center DC to an upstream side in the driving state where the bicycle sprocket 14 is rotated about the rotational center axis A1 during pedaling and within 90 degrees in the circumferential direction D1. In this embodiment, four of the recesses 50 are at least partly provided in the upstream angular range AR2. Two of the recesses 50 are entirely provided in the upstream angular range AR2. However, a total number of the recesses 50 provided in the upstream angular range AR2 is not limited to this embodiment. As seen in FIG. 2, the dead center DC is defined on a longitudinal axis CA2A of the crank arm CA2 or a longitudinal axis CA3A of the crank arm CA3.

As seen in FIG. 5, at least one of the at least one guide portion 48 is provided in the upstream angular area AR1. At least two of the guide portions 48 are preferably provided in the upstream angular area AR1. In this embodiment, three of the guide portions 48 are preferably provided in the upstream angular area AR1. However, a total number of the guide portions 48 provided in the upstream angular area AR1 is not limited to this embodiment.

At least one of the at least one guide portion 48 is provided in the upstream angular range AR2. At least two of the guide portions 48 are preferably provided in the upstream angular range AR2. In this embodiment, three of the guide portions 48 are preferably provided in the upstream angular range AR2. However, a total number of the guide portions 48 provided in the upstream angular range AR2 is not limited to this embodiment.

In this embodiment, the upstream angular area AR1 is substantially the same as the upstream angular range AR2. However, the upstream angular area AR1 can be different from the upstream angular range AR2. At least one of the guide portions 48 is preferably provided in the upstream angular area AR1 or the upstream angular range AR2. However, the remaining of the guide portions 48 provided outside the upstream angular area AR1 (the upstream angular range AR2) can be omitted from the bicycle sprocket 14.

At least one of the at least one guide portion 48 is provided on the upstream side with respect to the additional shifting facilitation projection 46. In this embodiment, the guide portion 48 is provided on the upstream side with respect to the additional shifting facilitation projection 46 in the upstream angular area AR1 (the upstream angular range AR2).

As seen in FIG. 5, the bicycle sprocket 14 comprises a shifting facilitation area SF configured to facilitate at least one of the first shifting operation and the second shifting operation. In this embodiment, the shifting facilitation area SF is configured to facilitate the first shifting operation and the second shifting operation. The shifting facilitation area SF is defined from the first outer-link tooth 28X to the first outer-link tooth 28Y. The first outer-link tooth 28X is the closest to the shifting facilitation projection 42 among the first sprocket teeth 24. The first outer-link tooth 28Y is the closest to the additional shifting facilitation projection 46 among the first sprocket teeth 24. The shifting facilitation area SF has an angular range smaller than 180 degrees. The shifting facilitation area SF has the angular range preferably smaller than 60 degrees.

At least one of the at least one guide portion 48 is provided in the shifting facilitation area SF. In this embodiment, two of the guide portions 48 are at least partly provided in the shifting facilitation area SF. However, a total number of the guide portions 48 provided in the shifting facilitation area SF is not limited to this embodiment.

Figure 20:
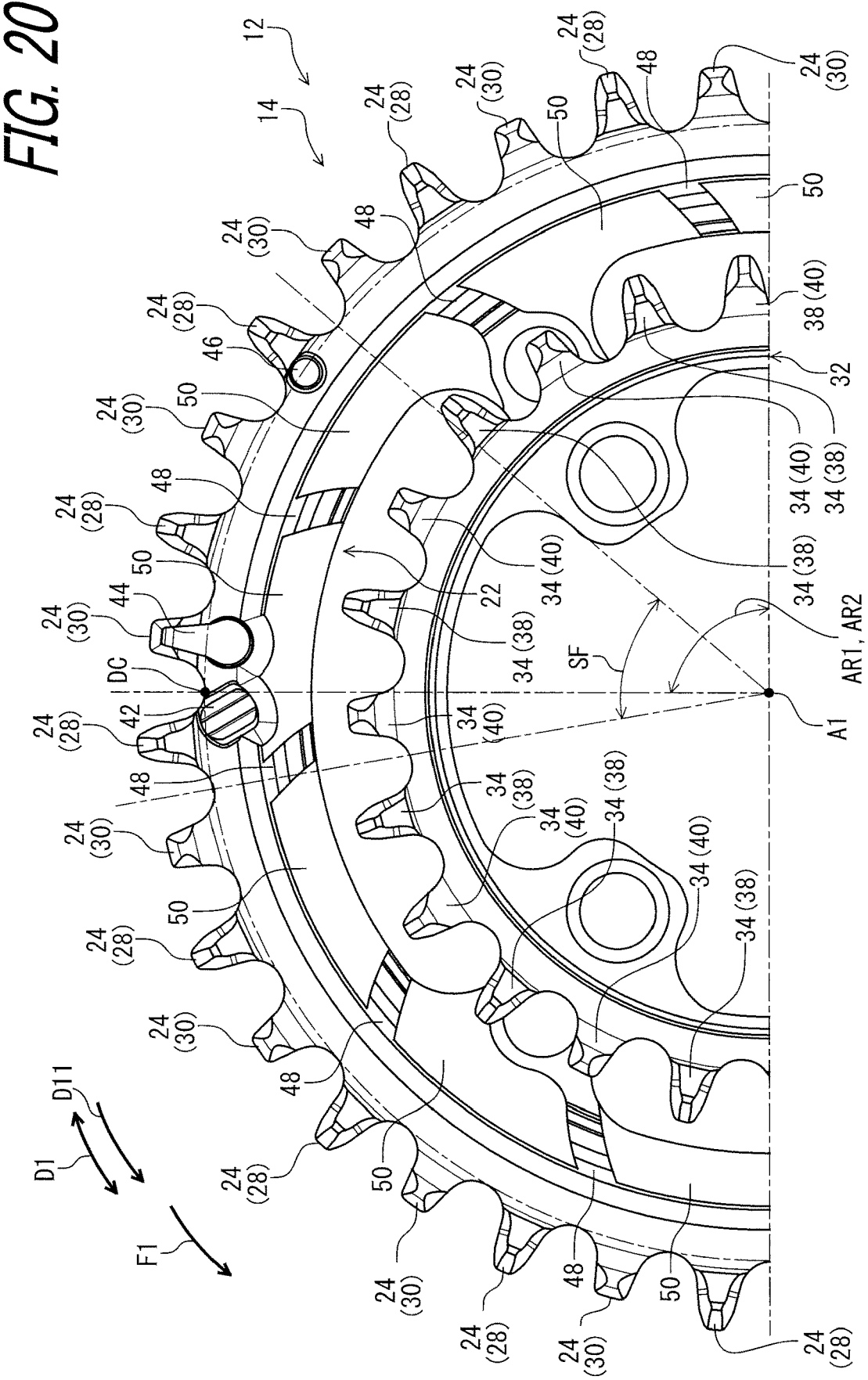
FIG. 20 is a partial side elevational view of the bicycle sprocket assembly illustrated in FIG. 3.

As seen in FIG. 20, the at least one guide portion 48 extends radially inwardly from a downstream side reverse to the upstream side toward the upstream side as viewed in the axial direction D2. The at least one guide portion 48 extends radially outwardly from the upstream side toward a downstream side reverse to the upstream side as viewed in the axial direction D2. The at least one guide portion 48 extends radially outwardly from the at least one inner-link tooth 40 as viewed in the axial direction D2. The at least one recess 50 is disposed radially outwardly of the at least one outer-link tooth 38 as viewed in the axial direction D2. The at least one guide portion 48 and the at least one inner-link tooth 40 are at least partly aligned with each other in a radial direction about the rotational center axis A1 as viewed from the axial direction D2. The at least one recess 50 and the at least one outer-link tooth 38 are at least partly aligned with each other in a radial direction about the rotational center axis A1 as viewed from the axial direction D2.

In this embodiment, the guide portions 48 extend radially inwardly from the downstream side to the upstream side as viewed in the axial direction D2. The guide portions 48 extend radially outwardly from the upstream side to the downstream side as viewed in the axial direction D2. The guide portions 48 respectively extend radially outwardly from the inner-link teeth 40 as viewed in the axial direction D2. The recesses 50 are respectively disposed radially outwardly of the outer-link teeth 38 as viewed in the axial direction D2.

Figure 21:
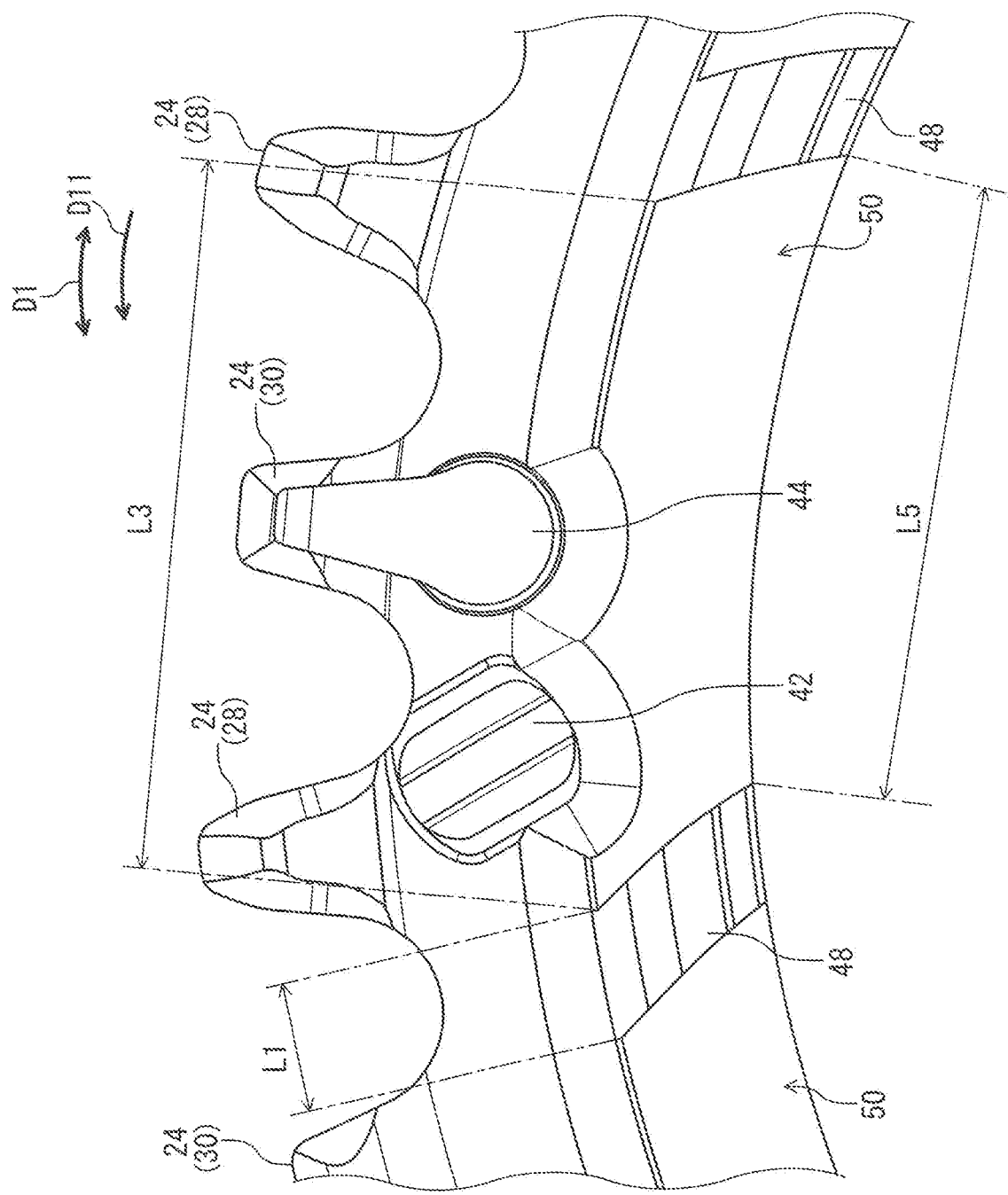
FIG. 21 is an enlarged partial side elevational view of the bicycle sprocket assembly illustrated in FIG. 3.

As seen in FIG. 21, the at least one guide portion 48 has a maximum circumferential length L1 defined in the circumferential direction D1. The maximum circumferential length L1 is equal to or smaller than 5 mm. The maximum circumferential length L1 preferably is equal to or smaller than 4.4 mm. In this embodiment, the guide portions 48 have shapes substantially identical to each other. Each of the guide portions 48 has the maximum circumferential length L1.

The at least one recess 50 has a recess circumferential length L3 defined in the circumferential direction D1. The recess circumferential length L3 is larger than a circumferential length L4 (FIGS. 12 and 18) of the portion of the outer link plate C1. The at least one recess 50 has a recess circumferential length L5 defined in the circumferential direction D1. The recess circumferential length L5 is larger than the circumferential length L4 (FIGS. 12 and 18) of the portion of the outer link plate C1. In this embodiment, each of the recesses 50 has the recess circumferential lengths L3 and L5.

In this embodiment, the recess circumferential length L3 is a maximum circumferential length of the recess 50. The recess circumferential length L5 is a minimum circumferential length of the recess 50. The recess circumferential length L3 is larger than the recess circumferential length L5. However, the dimensional relationship between the above lengths is not limited to this embodiment. The recess circumferential length L3 can be equal to the recess circumferential length L5. The recess circumferential length L5 preferably is equal to or larger than 20 mm.

As seen in FIG. 17, an axial distance AD1 is defined between the at least one guide portion 48 and the tooth-center plane CP4 in the axial direction D2. In this embodiment, the axial distance AD1 is defined between the tooth-center plane CP4 and each of the guide portions 48. The axial distance AD1 is equal to or larger than 4.5 mm and is equal to or smaller than 8 mm. The axial distance AD1 preferably is equal to or larger than 5.5 mm and is equal to or smaller than 6 mm.

Second Embodiment

A bicycle sprocket assembly 212 comprising a bicycle sprocket 214 in accordance with a second embodiment will be described below referring to FIGS. 22 and 23. The bicycle sprocket assembly 212 has the same structure as that of the bicycle sprocket assembly 12 except for the recess 50 of the bicycle sprocket 14. Thus, elements having substantially the same function as those in the first embodiment will be numbered the same here, and will not be described and/or illustrated again in detail here for the sake of brevity.

Figure 22:
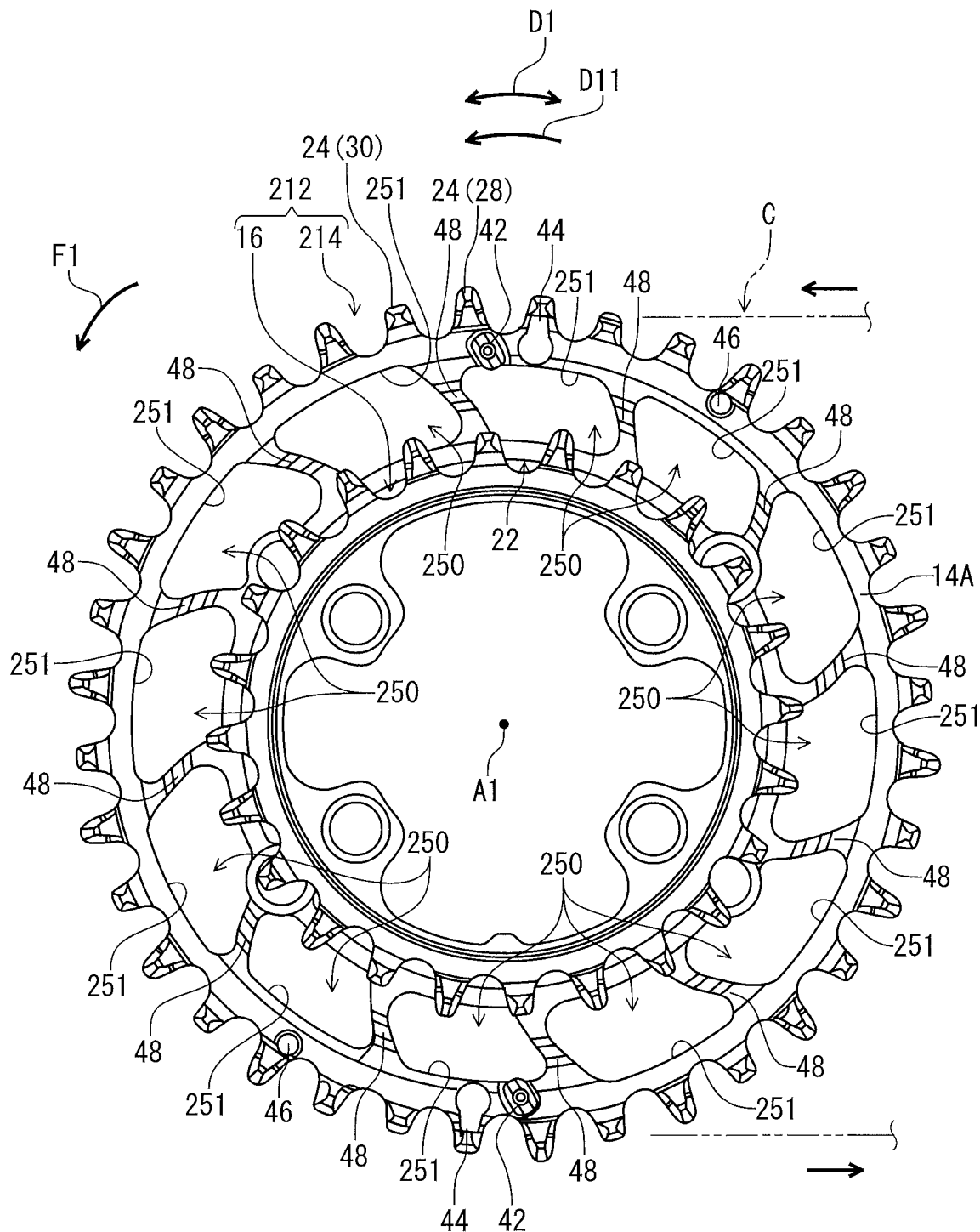
FIG. 22 is a side elevational view of a bicycle sprocket assembly in accordance with a second embodiment.
Figure 23:
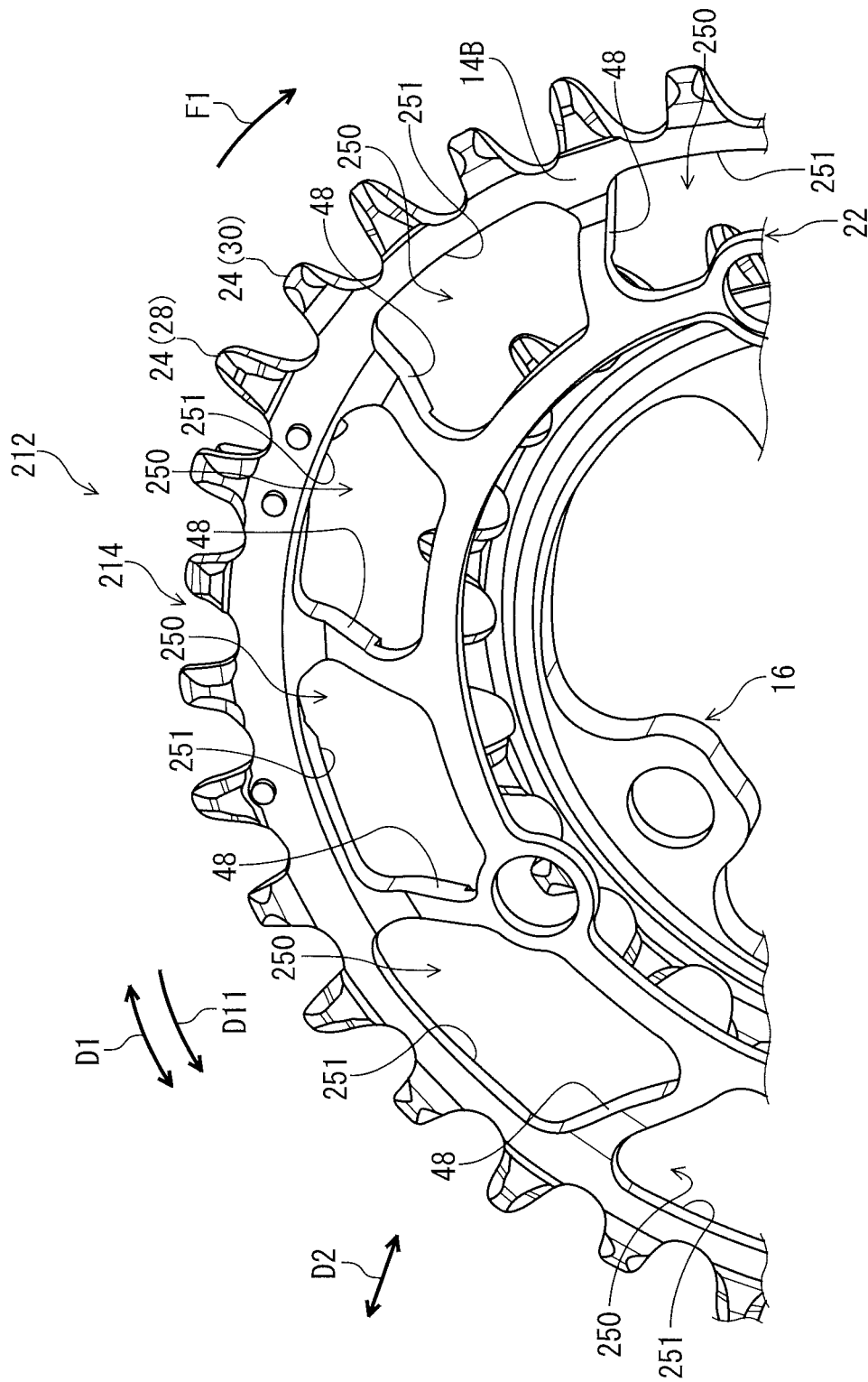
FIG. 23 is a perspective view of the bicycle sprocket assembly illustrated in FIG. 22.

As seen in FIGS. 22 and 23, the bicycle sprocket 214 comprises at least one recess 250. The at least one recess 250 comprises a through-hole 251 extending from the first side surface 14A to the second side surface 14B in the axial direction D2. In this embodiment, the at least one recess 250 includes recesses 250 each comprising the through-hole 251.

With the bicycle sprocket 214, it is possible to obtain substantially the same effect as that of the bicycle sprocket 14 of the first embodiment.

Third Embodiment

A bicycle sprocket assembly 312 comprising a bicycle sprocket 314 in accordance with a third embodiment will be described below referring to FIGS. 24 to 28. The bicycle sprocket assembly 312 has the same structure as that of the bicycle sprocket assembly 12 except for the first sprocket body 22 and the guide portion 48. Thus, elements having substantially the same function as those in the above embodiments will be numbered the same here, and will not be described and/or illustrated again in detail here for the sake of brevity.

Figure 24:
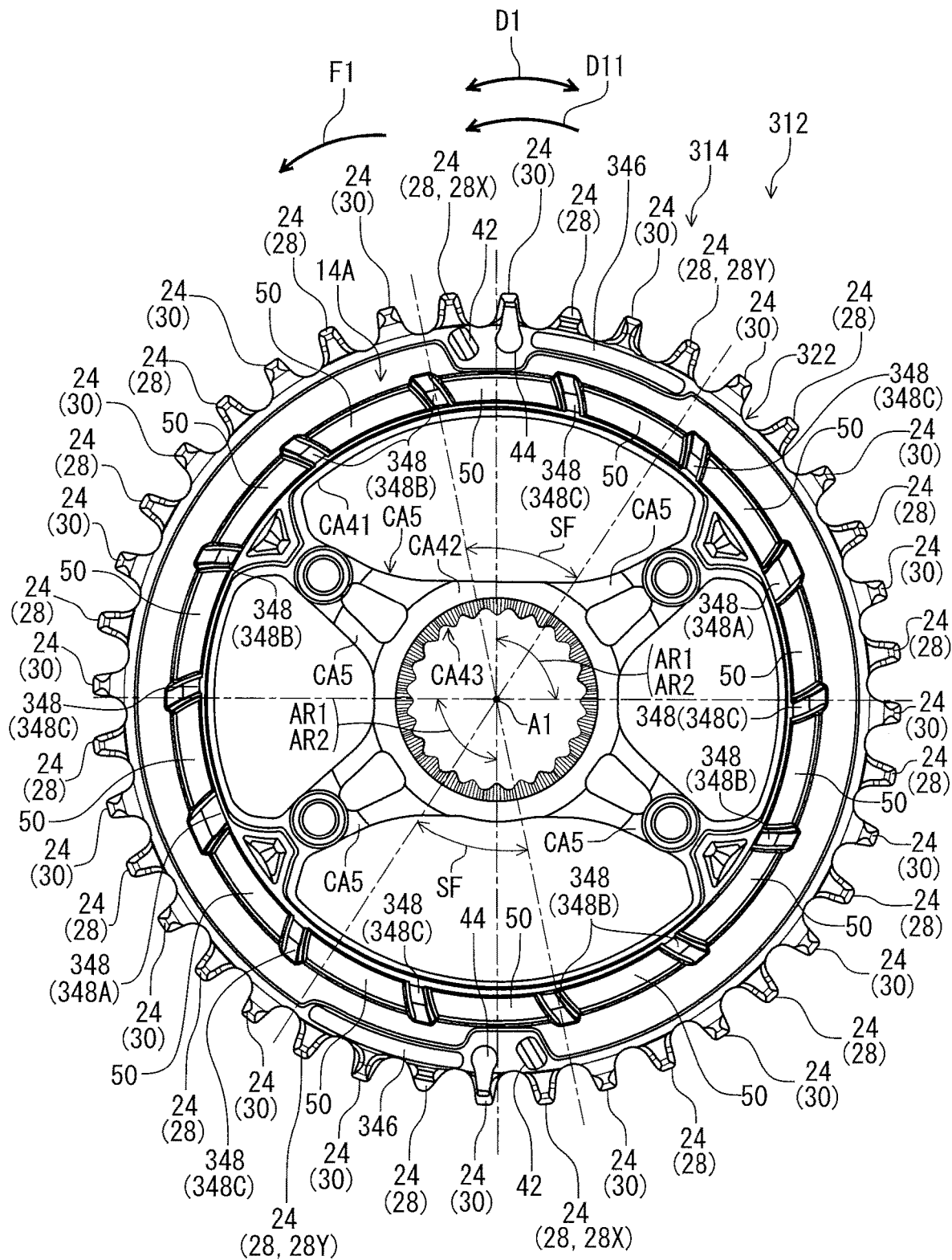
FIG. 24 is a side elevational view of a bicycle sprocket assembly in accordance with a third embodiment, with the smaller sprocket omitted.

As seen in FIG. 24, in the bicycle sprocket assembly 312, the bicycle sprocket 314 comprises a first sprocket body 322, the first sprocket teeth 24, the at least one shifting facilitation projection 42, at least one guide portion 348, and the at least one recess 50. The at least one guide portion 348 includes guide portions 348. The at least one guide portion 348 includes a first guide portion 348A and a second guide portion 348B. The first guide portion 348A is provided in the upstream angular area AR1. The second guide portion 348B is provided outside the upstream angular area AR1. The at least one guide portion 348 includes a third guide portion 348C provided in the upstream angular area AR1.

In this embodiment, the at least one guide portion 348 includes first guide portions 348A, second guide portions 348B, and third guide portions 348C. However, a total number of the first guide portions 348A is not limited to this embodiment. A total number of the second guide portions 348B is not limited to this embodiment. A total number of the third guide portions 348C is not limited to this embodiment.

Figure 25:
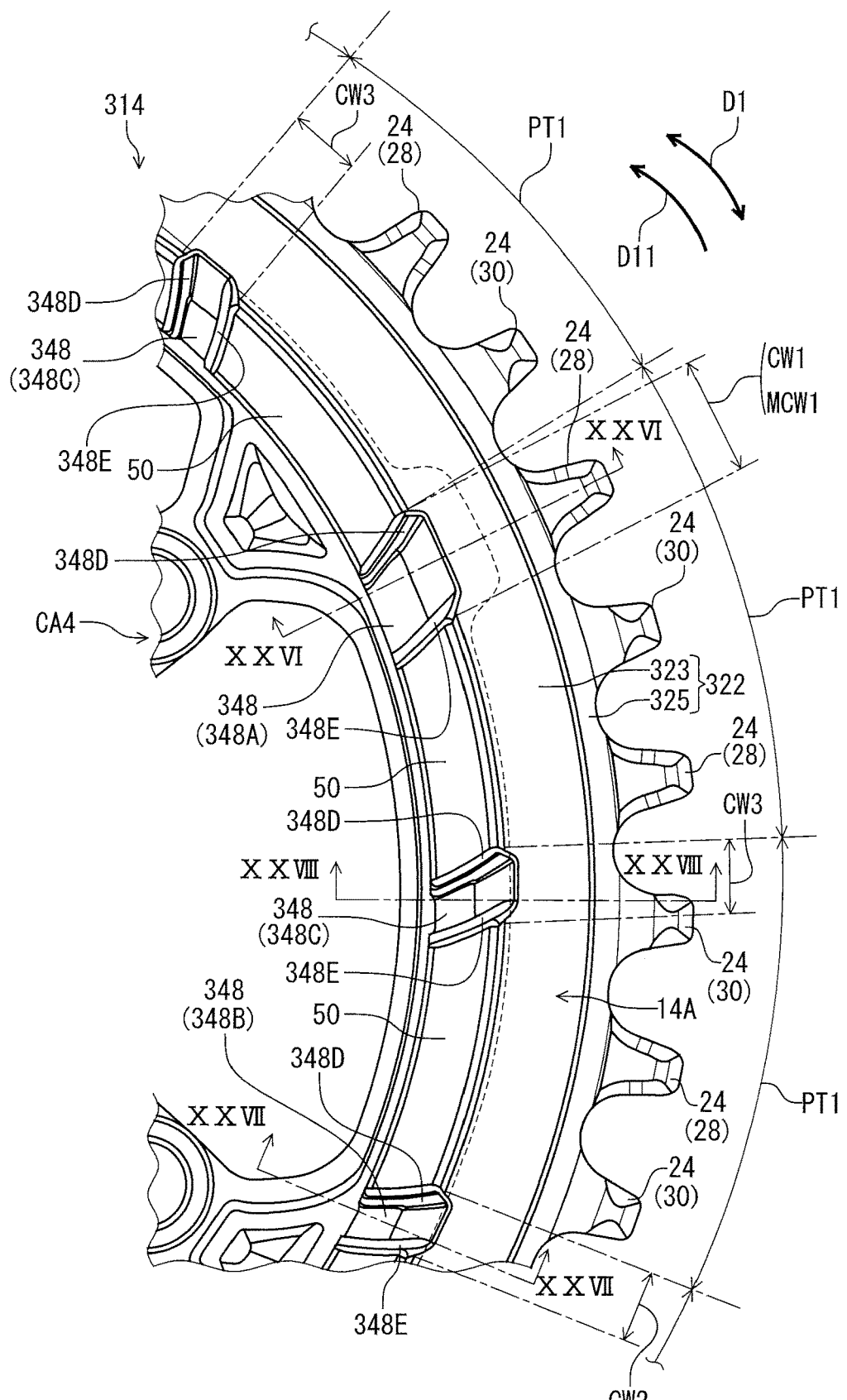
FIG. 25 is a partial side elevational view of a bicycle sprocket of the bicycle sprocket assembly illustrated in FIG. 24.

As seen in FIG. 25, the first guide portion 348A has a first circumferential width CW1 defined in the circumferential direction D1. The second guide portion 348B has a second circumferential width CW2 defined in the circumferential direction D1. The third guide portion 348C has a third circumferential width CW3 defined in the circumferential direction D1. The first circumferential width CW1 is larger than the second circumferential width CW2 and the third circumferential width CW3. However, the first circumferential width CW1 can be equal to or smaller than at least one of the second circumferential width CW2 and the third circumferential width CW3. In this embodiment, the second circumferential width CW2 is substantially equal to the third circumferential width CW3. However, the second circumferential width CW2 can be different from the third circumferential width CW3.

The first guide portion 348A has a first maximum circumferential width MCW1. For example, the first maximum circumferential width MCW1 ranges from 6 mm to 8 mm. However, the first maximum circumferential width MCW1 is not limited to the above range. In a case where the first maximum circumferential width MCW1 ranges from 6 mm to 8 mm, the second guide portions 348B can be omitted from the bicycle sprocket 314. In this embodiment, the first maximum circumferential width MCW1 is substantially equal to the first circumferential width CW1. However, the first maximum circumferential width MCW1 can be different from the first circumferential width CW1.

Figure 26:
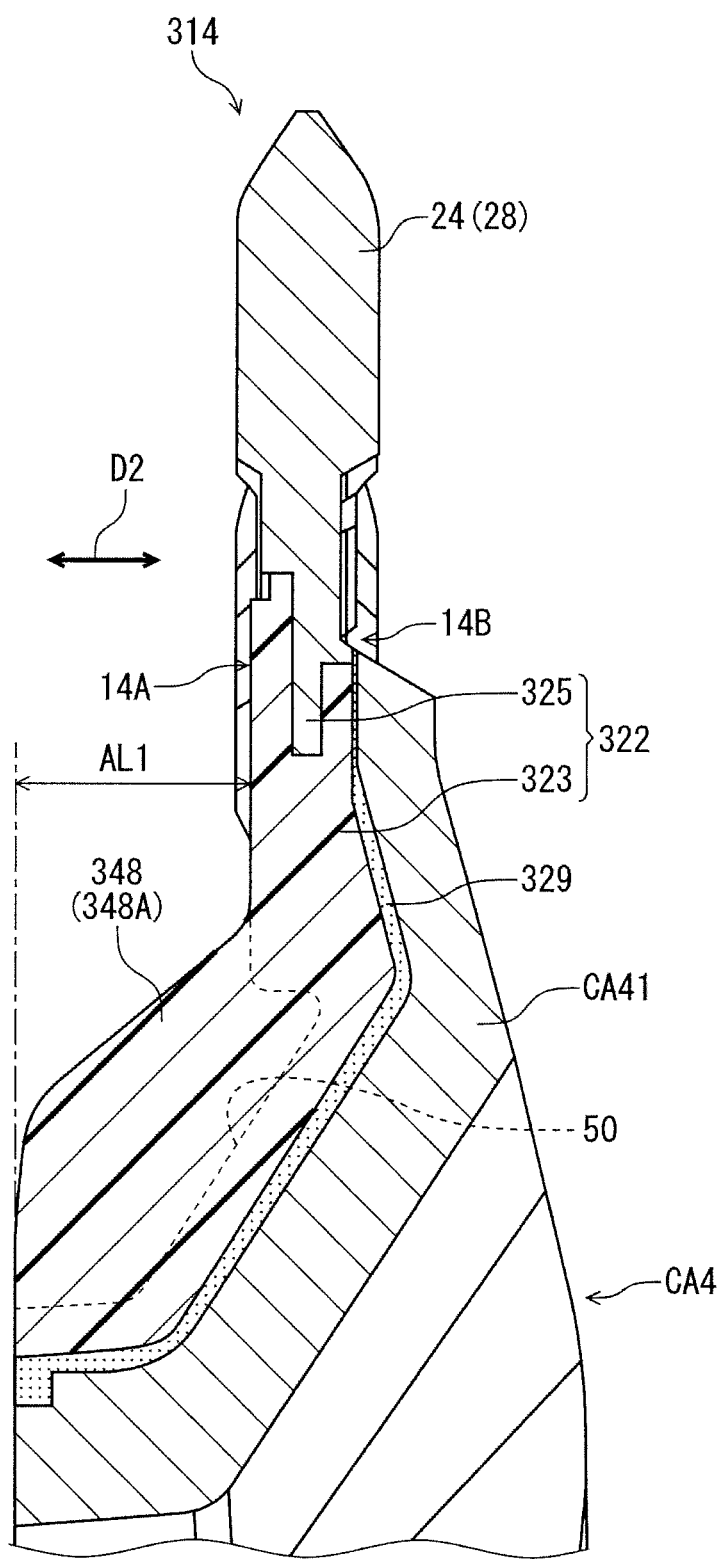
FIG. 26 is a cross-sectional view of the bicycle sprocket taken along line XXVI-XXVI of FIG. 25.
Figure 27:
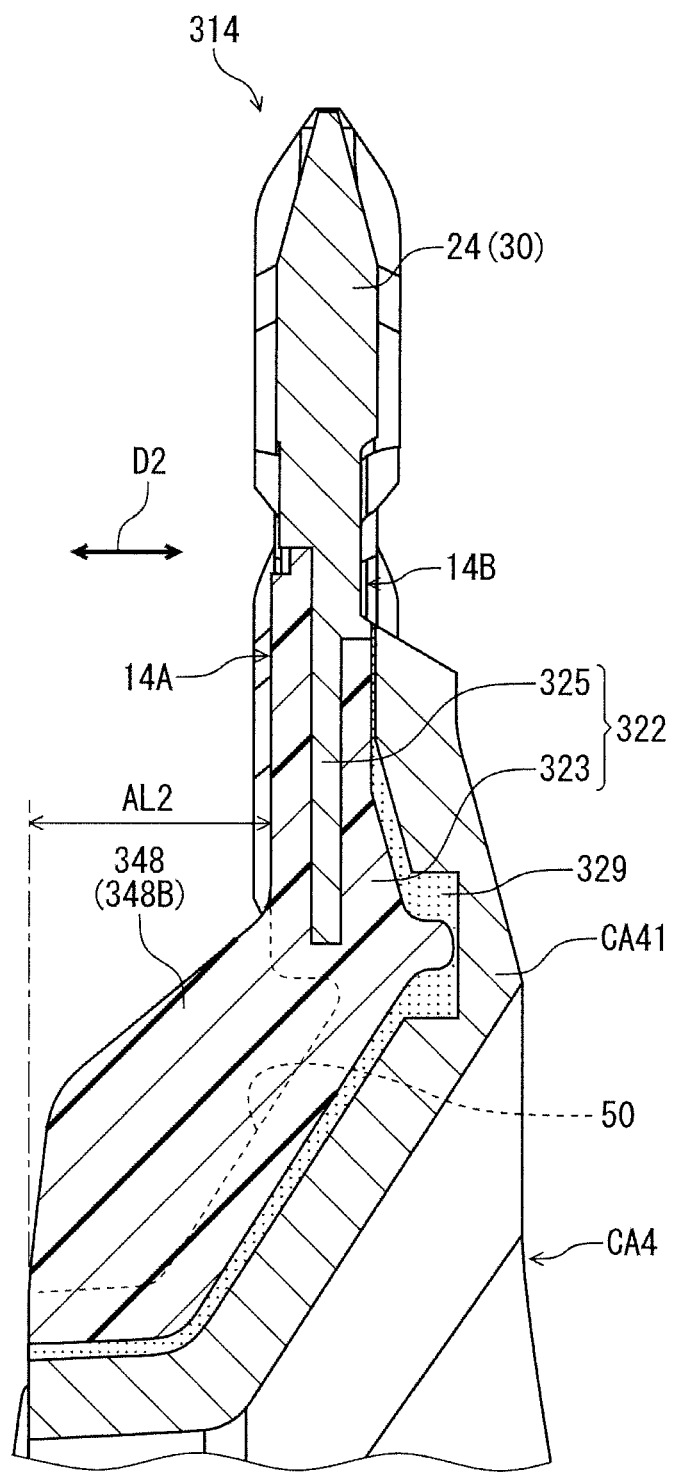
FIG. 27 is a cross-sectional view of the bicycle sprocket taken along line XXVII-XXVII of FIG. 25.
Figure 28:
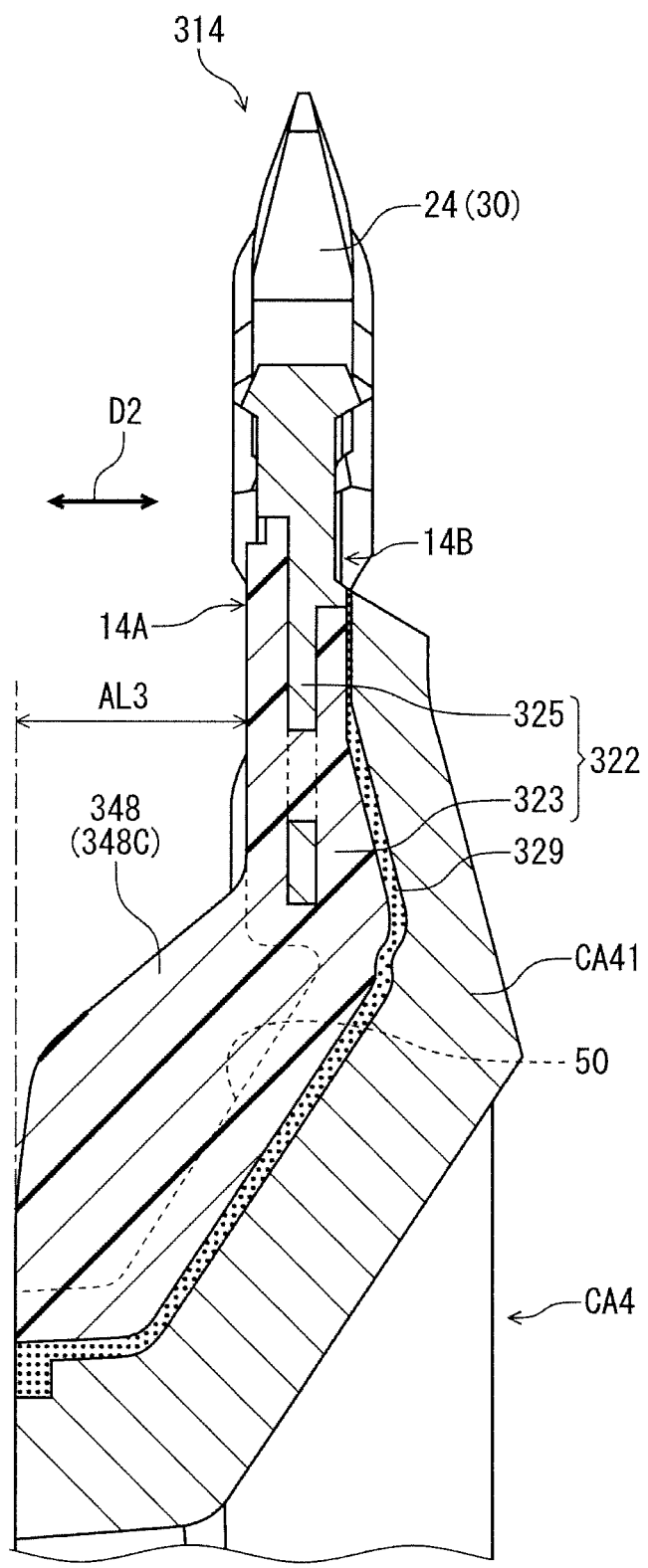
FIG. 28 is a cross-sectional view of the bicycle sprocket taken along line XXVIII-XXVIII of FIG. 25.

As seen in FIG. 26, the first guide portion 348A has a first axial length AL1 defined from the first sprocket body 322 in the axial direction D2. As seen in FIG. 27, the second guide portion 348B has a second axial length AL2 defined from the first sprocket body 322 in the axial direction D2. As seen in FIG. 28, the third guide portion 348C has a third axial length AL3 defined from the first sprocket body 322 in the axial direction D2. The first axial length AL1 is substantially equal to the second axial length AL2 and the third axial length AL3. However, the first axial length AL1 can be different from at least one of the second axial length AL2 and the third axial length AL3.

As seen in FIG. 25, the guide portion 348 includes a downstream side surface 348D and an upstream side surface 348E. The downstream side surface 348D is provided on a downstream side of the upstream side surface 348E in the driving rotational direction D11 in the guide portion 348. Each of the first to third guide portions 348A to 348C includes the downstream side surface 348D and the upstream side surface 348E. The downstream side surfaces 348D of the guide portions 348 are arranged in the circumferential direction D1 at a first pitch PT1.

The first circumferential width CW1 is defined between the downstream side surface 348D and the upstream side surface 348E of the first guide portion 348A. The second circumferential width CW2 is defined between the downstream side surface 348D and the upstream side surface 348E of the second guide portion 348B. The third circumferential width CW3 is defined between the downstream side surface 348D and the upstream side surface 348E of the third guide portion 348C.

As seen in FIG. 24, the bicycle sprocket 314 further comprises an additional shifting facilitation projection 346 provided on the first side surface 14A to facilitate a second shifting operation in which the bicycle chain C is shifted from the bicycle sprocket 314 to the smaller sprocket 16 (FIG. 14). The additional shifting facilitation projection 346 has substantially the same structure as that of the additional shifting facilitation projection 46 of the first embodiment. In this embodiment, the additional shifting facilitation projection 346 extends toward the shifting facilitation projection 42 in the circumferential direction D1 from the position of the additional shifting facilitation projection 46 of the first embodiment.

As seen in FIG. 25, the outer link plate C1 (FIG. 14) of the bicycle chain C slides with the first guide portion 348A around the upstream side surface 348E in the second shifting operation. Since the first circumferential width CW1 is larger than the second circumferential width CW2, an intermediate portion of the outer link plate C1 of the bicycle chain C is likely to slide with the first guide portion 348A around the upstream side surface 348E in the second shifting operation. This reduces wear of the first guide portion 348A.

As seen in FIGS. 25 to 28, the first sprocket body 322 includes a resin part 323. As seen in FIGS. 26 and 27, the first guide portion 348A and the second guide portion 348B are integrally provided with the resin part 323 as a one-piece unitary member. As seen in FIG. 28, the third guide portion 348C is integrally provided with the resin part 323 as a one-piece unitary member.

As seen in FIG. 25, the first sprocket body 322 includes a ring part 325. The first sprocket teeth 24 extends radially outwardly from the ring part 325. As seen in FIGS. 26 to 28, the ring part 325 is at least partly embedded in the resin part 323. For example, the ring part 325 is integrally provided with the first sprocket teeth 24 as a one-piece unitary member. The ring part 325 and the first sprocket teeth 24 are made of a metallic material. The resin part 323 is made of a non-metallic material such as a resin material. However, the materials of the resin part 323 and the ring part 325 are not limited to this embodiment.

As seen in FIGS. 26 to 28, the first sprocket body 322 is attached to a cover CA41 of the sprocket mounting member CA4. The resin part 323 of the first sprocket body 322 is attached to the cover CA41 with adhesive 329. As seen in FIG. 24, the cover CA41 has an annular shape. The sprocket mounting member CA4 includes an engagement part CA42. The crank connecting arms CA5 couples the cover CA41 to the engagement part CA42. The engagement part CA42 includes an internal spline CA43 engaged with the crank arm CA2 (FIG. 1). The internal spline CA43 is formed around a central opening of the engagement part CA42.

Fourth Embodiment

A bicycle sprocket assembly 412 comprising a bicycle sprocket 414 in accordance with a fourth embodiment will be described below referring to FIGS. 29 to 34. The bicycle sprocket assembly 412 has the same structure as that of the bicycle sprocket assembly 312 except for the first guide portion 348A. Thus, elements having substantially the same function as those in the above embodiments will be numbered the same here, and will not be described and/or illustrated again in detail here for the sake of brevity.

Figure 29:
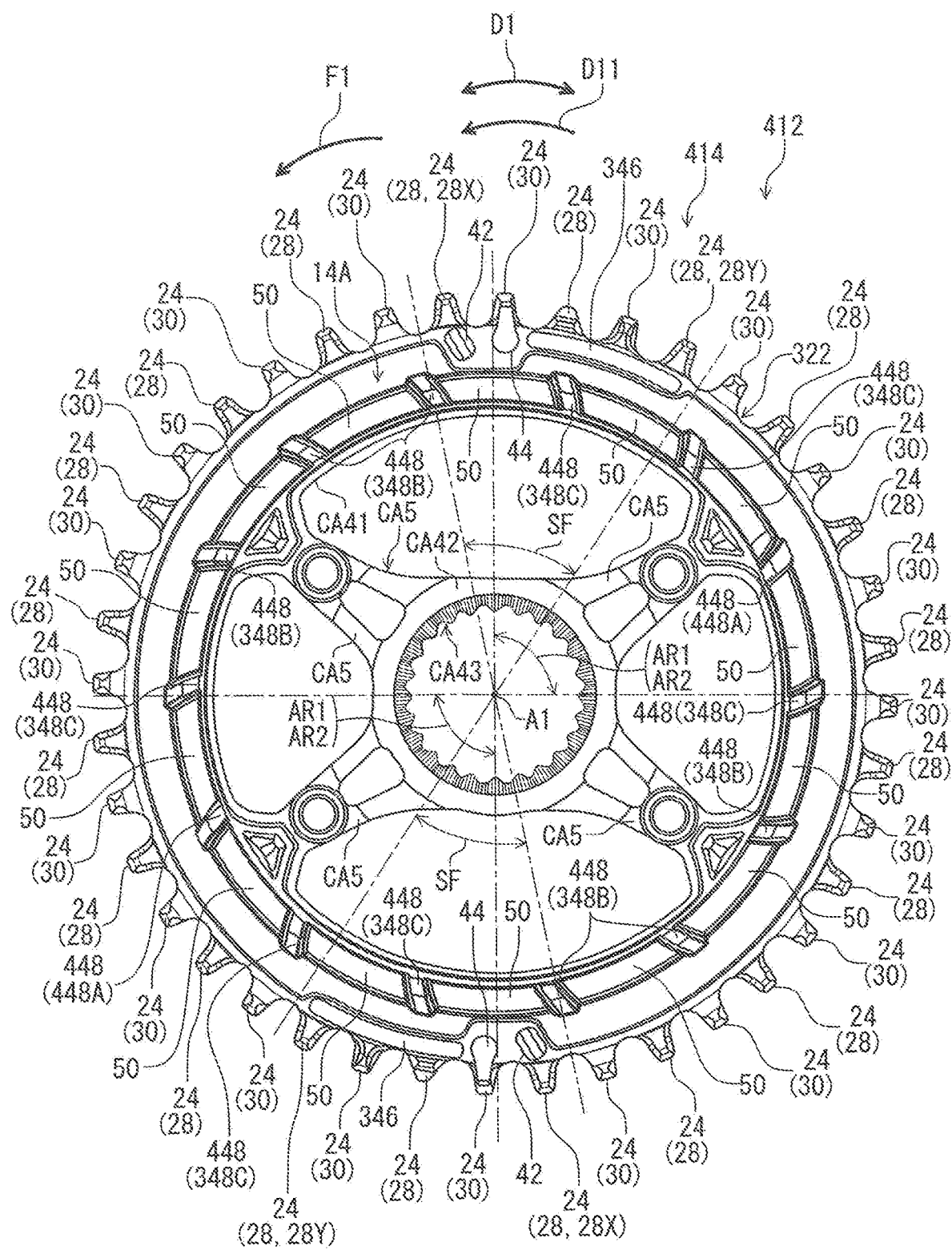
FIG. 29 is a side elevational view of a bicycle sprocket assembly in accordance with a fourth embodiment, with the smaller sprocket omitted.

As seen in FIG. 29, in the bicycle sprocket assembly 412, the bicycle sprocket 414 comprises the first sprocket body 322, the first sprocket teeth 24, the at least one shifting facilitation projection 42, at least one guide portion 448, and the at least one recess 50. The at least one guide portion 448 has substantially the same structure as that of the at least one guide portion 348 of the third embodiment.

The at least one guide portion 448 includes the second guide portion 348B and the third guide portion 348C. The second guide portion 348B can also be referred to as an additional guide portion 348B. The third guide portion 348C can also be referred to as an additional guide portion 348C. Namely, the at least one guide portion 448 includes the additional guide portion 348B and the additional guide portion 348C. The second guide portion 348B is provided outside the upstream angular area AR1. The third guide portion 348C is provided in the upstream angular area AR1.

In this embodiment, the at least one guide portion 448 includes a first guide portion 448A instead of the first guide portion 348A. The at least one guide portion 448 includes first guide portions 448A. The first guide portion 448A is provided in the upstream angular area AR1.

Figure 30:
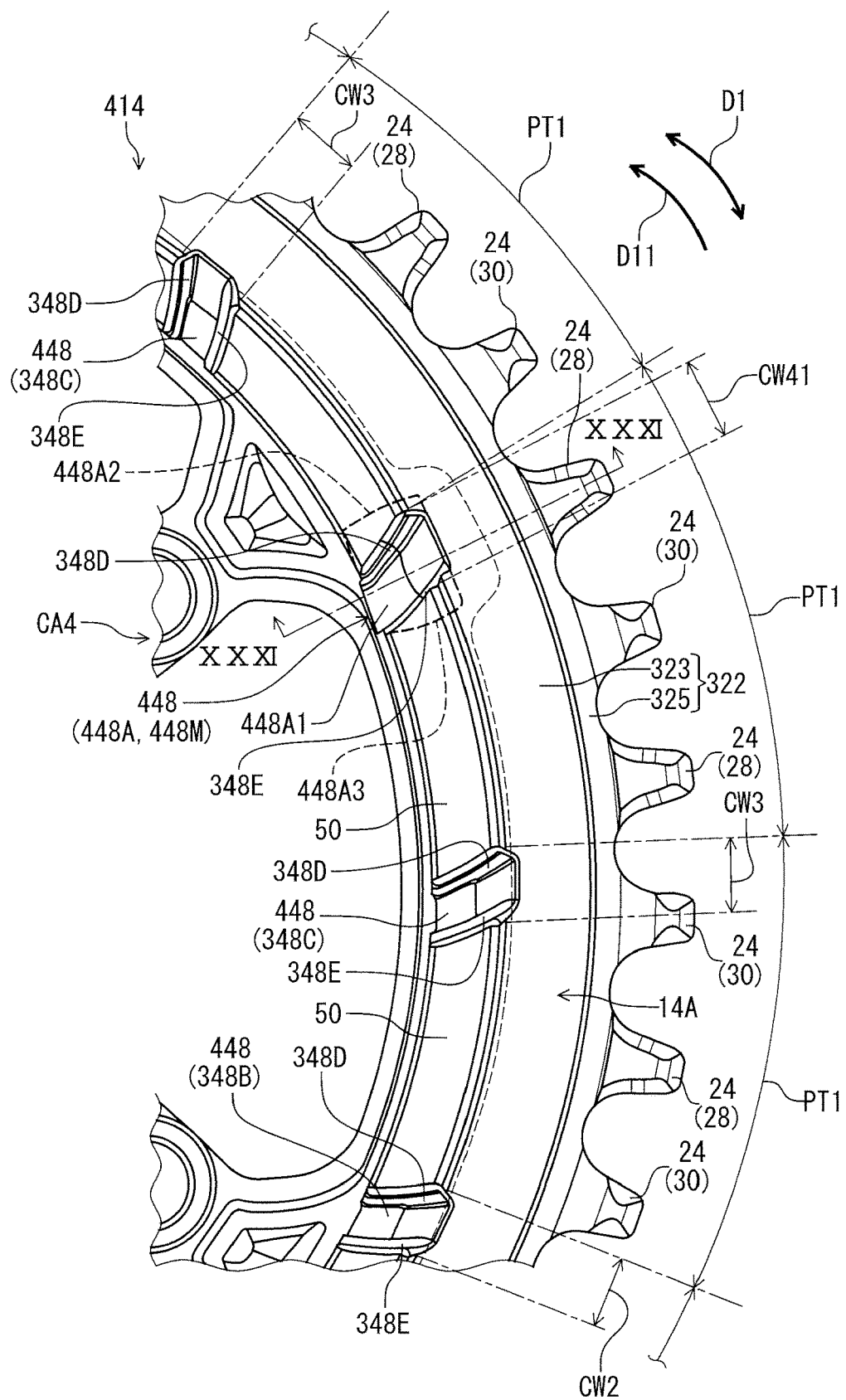
FIG. 30 is a partial side elevational view of a bicycle sprocket of the bicycle sprocket assembly illustrated in FIG. 29.

As seen in FIG. 30, the first sprocket body 322 includes the resin part 323. The second guide portion 348B is made of a resin material. The third guide portion 348C is made of a resin material. Similarly to the third embodiment, the additional guide portion 348B is integrally provided with the resin part 323 as a one-piece unitary member. The additional guide portion 348C is integrally provided with the resin part 323 as a one-piece unitary member.

The first guide portion 448A has a metallic part 448M. The metallic part 448M is at least partly exposed from the first sprocket body 322. The first guide portion 448A is provided at the resin part 323. The first guide portion 448A is at least partly exposed from the resin part 323. The metallic part 448M is made of a metallic material such as aluminum, iron, titanium, and stainless steel.

Figure 31:
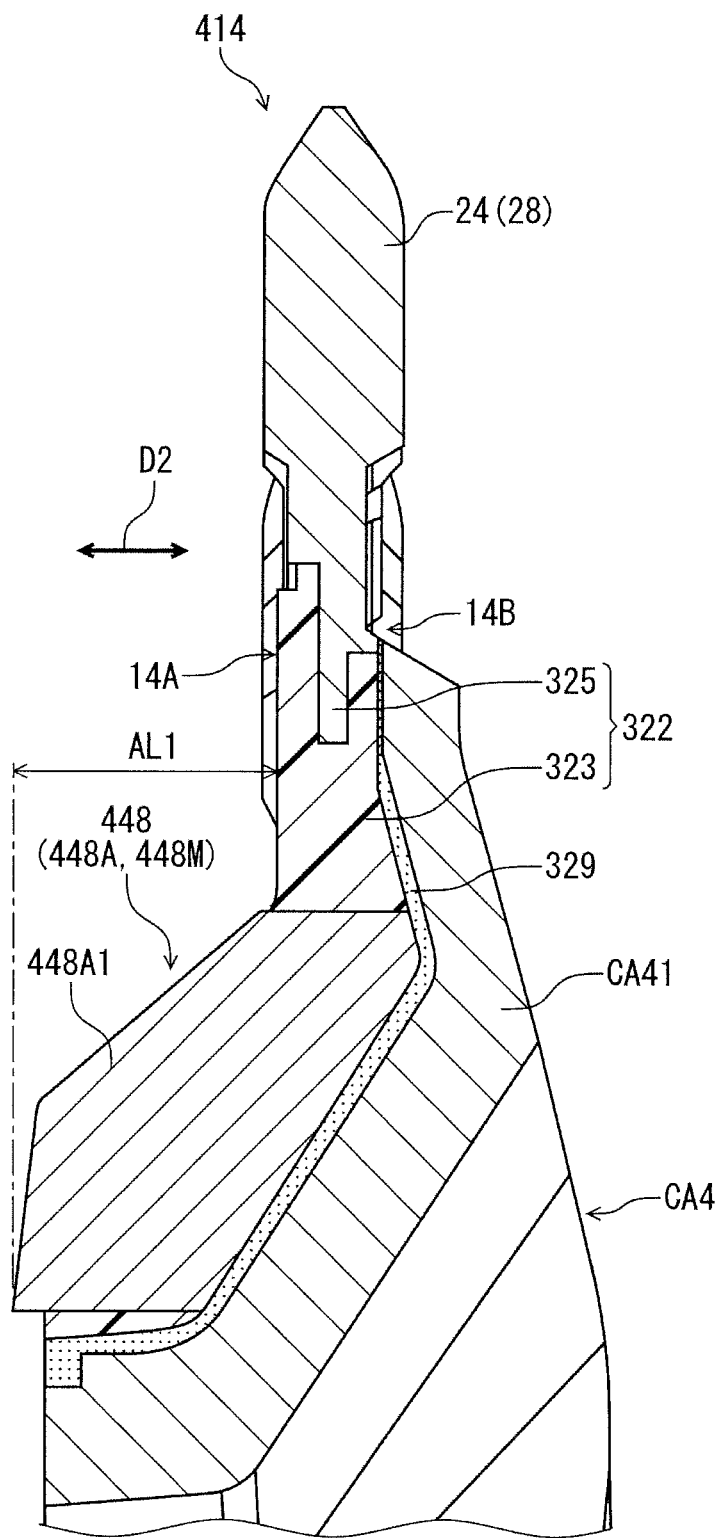
FIG. 31 is a cross-sectional view of the bicycle sprocket taken along line XXXI-XXXI of FIG. 30.

As seen in FIG. 31, the metallic part 448M is at least partly embedded in the resin part 323. For example, the first guide portion 448A and the ring part 325 are embedded in the resin part 323 in integral molding such as insert molding. The resin part 323 is at least partly covered with a cover CA41 of the sprocket mounting member CA4 (FIG. 1). The attachment structure of the first guide portion 448A is not limited to this embodiment. For example, the first guide portion 448A can be attached to the resin part 323 with another structure such as adhesive instead of or in addition to the integral molding. Furthermore, the first guide portion 448A can be coupled to the ring part 325. The first guide portion 448A can be integrally provided with the ring part 325 as a one-piece unitary member.

Figure 32:
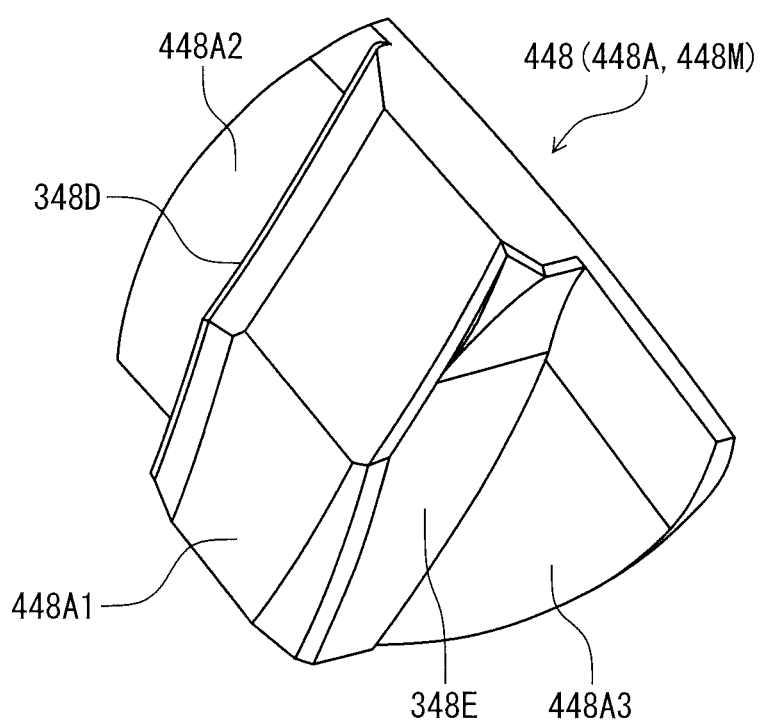
FIG. 32 is a perspective view of a first guide portion of the bicycle sprocket assembly illustrated in FIG. 29.

As seen in FIG. 32, the first guide portion 448A includes a guide body 448A1, a first arm 448A2, and a second arm 448A3. The first arm 448A2 extends from the guide body 448A1. The second arm 448A3 extends from the guide body 448A1 toward an opposite side of the first arm 448A2. The guide body 448A1, the first arm 448A2, and the second arm 448A3 are made of a metallic material and are integrally provided with each other as a one-piece unitary member. Namely, the guide body 448A1, the first arm 448A2, and the second arm 448A3 constitute the metallic part 448M. In this embodiment, the first guide portion 448A is entirely made of a metallic material. However, the first guide portion 448A can include a non-metallic material. For example, a guide surface of the first guide portion 448A can be made of a metallic material, and another part of the first guide portion 448A can be made of a non-metallic material such as a resin material.

Figure 33:
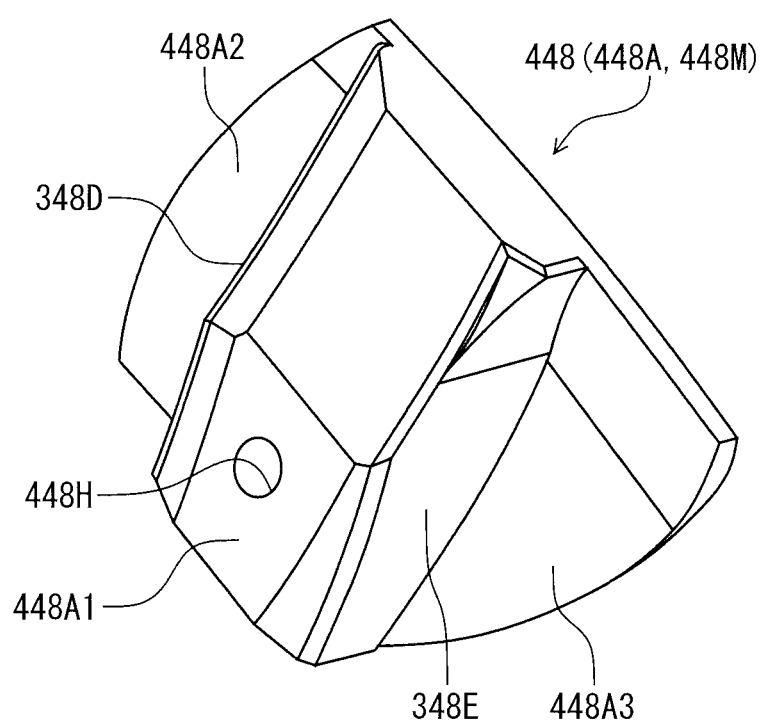
FIG. 33 is a perspective view of a first guide portion of the bicycle sprocket assembly in accordance with a modification.

As seen in FIG. 33, the first guide portion 448A can include a hole 448H to position the first guide portion 448A relative to the ring part 325 (FIG. 31) in the integral molding.

As seen in FIG. 30, the first arm 448A2 and the second arm 448A3 are entirely provided in the resin part 323 of the first sprocket body 322. The guide body 448A1 is partly exposed from the resin part 323.

The first guide portion 448A has a first circumferential width CW41 defined in the circumferential direction D1. The first circumferential width CW41 is substantially equal to the second circumferential width CW2 and the third circumferential width CW3. However, the first circumferential width CW41 can be different from at least one of the second circumferential width CW2 and the third circumferential width CW3. The first circumferential width CW41 can be larger than at least one of the second circumferential width CW2 and the third circumferential width CW3 as well as the third embodiment.

Figure 34:
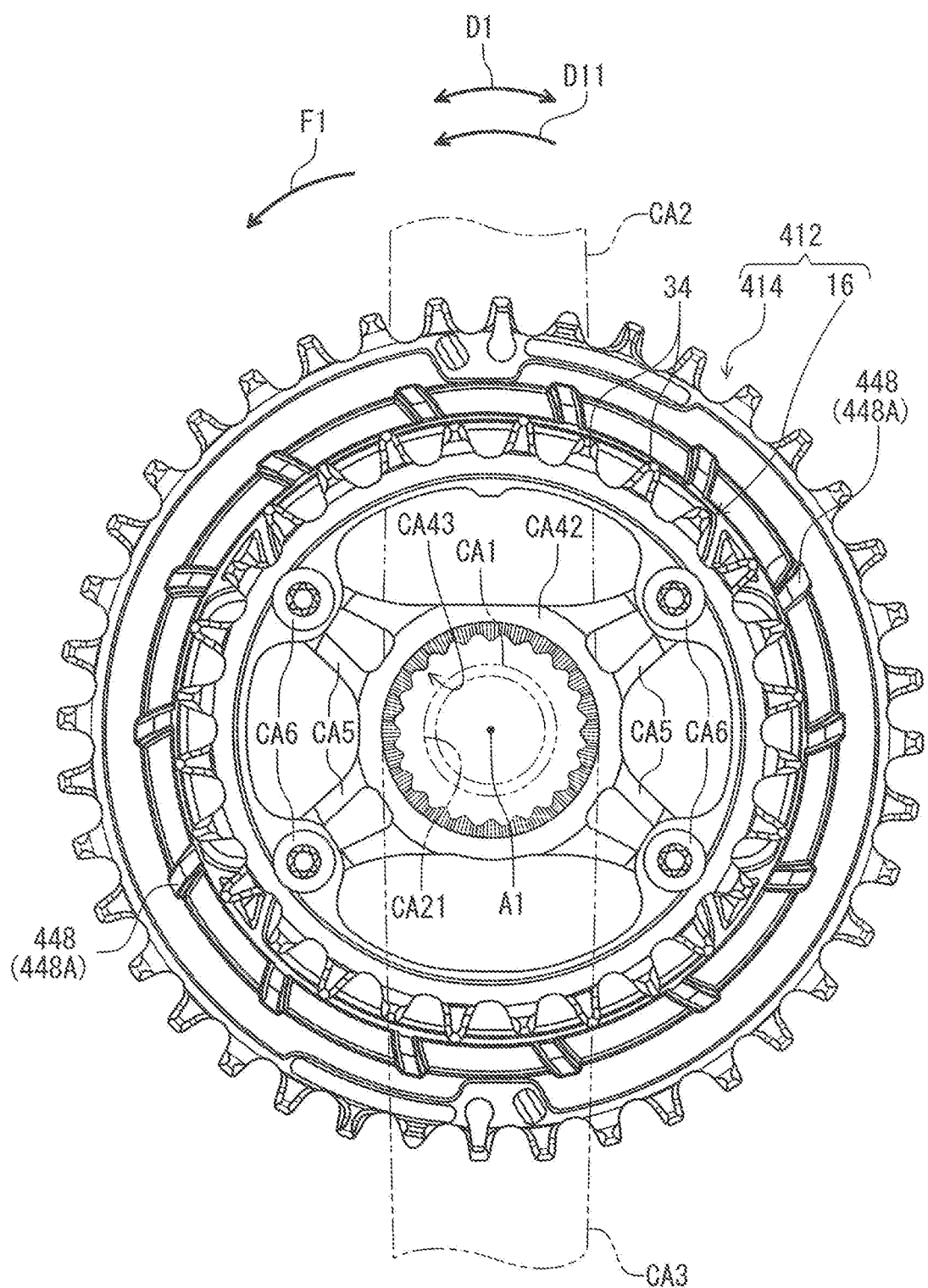
FIG. 34 is a side elevational view of a bicycle crank assembly including the bicycle sprocket assembly in accordance with the fourth embodiment.

As seen in FIG. 34, for example, the bicycle sprocket 414 is mounted on a boss CA21 of the crank arm CA2. The internal spline CA43 of the engagement part CA42 is engaged with an external spline of the boss CA21 of the crank arm CA2. The engagement part CA42 is secured to the boss CA21 of the crank arm CA2 with a lock ring (not shown). The smaller sprocket 16 is secured to the sprocket mounting member CA4 with fasteners CA6. This sprocket mounting structure can be applied to the bicycle sprocket assembly 312 of the third embodiment.

In this embodiment, as seen in FIG. 29, a total number of the guide portions 448 is 14. As seen in FIG. 34, a total number of the second sprocket teeth 34 is 28. Namely, the total number of the guide portions 448 is a half of the total number of the second sprocket teeth 34. However, the total number of the guide portions 448 is not limited to this embodiment. For example, the total number of the guide portions 448 can be different from a half of the total number of the second sprocket teeth 34. The smaller sprocket 16 illustrated in FIG. 34 can be combined with the bicycle sprocket 314 illustrated in FIG. 24. As seen in FIG. 24, a total number of the guide portions 348 is 14. Namely, the total number of the guide portions 348 is a half of the total number of the second sprocket teeth 34.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a first sprocket body;
   first sprocket teeth extending radially outwardly from the first sprocket body to define a first chain-phase state where at least one of the first sprocket teeth is received in only one of
   an inner link space defined between an opposed pair of inner link plates of a bicycle chain, and
   an outer link space defined between an opposed pair of outer link plates of the bicycle chain;
   a first side surface provided on the first sprocket body and facing toward a first side of an axial direction of a rotational center axis of the bicycle sprocket;
   a second side surface provided on the first sprocket body and facing toward a second side of the axial direction reverse to the first side;
   at least one shifting facilitation projection configured to facilitate a first shifting operation in which the bicycle chain is shifted from a smaller sprocket to the bicycle sprocket;
   at least two guide portions provided on the first side surface to guide the bicycle chain from the bicycle sprocket toward the smaller sprocket in a second shifting operation in which the bicycle chain is shifted from the bicycle sprocket to the smaller sprocket; and
   at least one recess provided on the first side surface so as to be provided between and defined by adjacent guide portions of the at least two guide portions in a circumferential direction defined about the rotational center axis, at least one of the at least one recess being provided in an upstream angular area defined from the at least one shifting facilitation projection to an upstream side in a driving state where the bicycle sprocket is rotated about the rotational center axis during pedaling and within 90 degrees in the circumferential direction.

2. The bicycle sprocket according to claim 1, wherein
at least one of the at least two guide portions is provided in an upstream angular range defined from a dead center to the upstream side and within 90 degrees in the circumferential direction.

3. The bicycle sprocket according to claim 2, wherein
the at least one guide portion includes guide portions each provided on the first side surface to guide the bicycle chain from the bicycle sprocket toward the smaller sprocket in the second shifting operation, and
at least two of the guide portions are provided in the upstream angular range.

4. The bicycle sprocket according to claim 2, wherein
the at least one recess includes recesses provided on the first side surface to reduce interference between the bicycle sprocket and the bicycle chain, and
the recesses and the guide portions are alternately arranged in the circumferential direction.

5. The bicycle sprocket according to claim 1, wherein
the at least two guide portions are provided on the first side surface to face an inner link plate of the bicycle chain in the axial direction in a state where the bicycle chain is engaged with the smaller sprocket to transmit a pedaling force between the smaller sprocket and the bicycle chain.

6. The bicycle sprocket according to claim 5, wherein
the at least two guide portions are configured to be provided between adjacent outer link plates of the bicycle chain in a chain running direction in the state where the bicycle chain is engaged with the smaller sprocket to transmit the pedaling force between the smaller sprocket and the bicycle chain.

7. The bicycle sprocket according to claim 1, wherein
the at least two one guide portions extend radially inwardly from a downstream side reverse to the upstream side toward the upstream side as viewed in the axial direction.

8. The bicycle sprocket according to claim 1, wherein
the smaller sprocket includes a reference tooth,
the reference tooth has
   a maximum axial width defined in the axial direction, and
   a tooth-center plane defined to bisect the maximum axial width,
an axial distance is defined between the at least two guide portions and the tooth-center plane in the axial direction, and
the axial distance is equal to or larger than 4.5 mm and is equal to or smaller than 8 mm.

9. The bicycle sprocket according to claim 1, wherein
the at least two one guide portions have a maximum circumferential length defined in the circumferential direction, and
the maximum circumferential length is equal to or smaller than 5 mm.

10. The bicycle sprocket according to claim 1, wherein
the at least one recess is provided on the first side surface to face a portion of the outer link plate of the bicycle chain in the axial direction in a state where the bicycle chain is engaged with the smaller sprocket to transmit a pedaling force between the smaller sprocket and the bicycle chain.

11. The bicycle sprocket according to claim 10, wherein
the at least one recess has a recess circumferential length defined in the circumferential direction, and
the recess circumferential length is larger than a circumferential length of the portion of the outer link plate.

12. The bicycle sprocket according to claim 1, wherein
the at least one recess comprises a through-hole extending from the first side surface to the second side surface in the axial direction.

13. A bicycle sprocket assembly comprising:
the bicycle sprocket according to claim 1; and
the smaller sprocket comprising:
   a second sprocket body; and
   second sprocket teeth extending radially outwardly from the second sprocket body to define a second chain-phase state where at least one of the second sprocket teeth is received in only one of the inner link space and the outer link space.

14. The bicycle sprocket assembly according to claim 13, wherein
the second sprocket teeth include at least one inner-link tooth extending radially outwardly from the second sprocket body to be received in only the inner link space, and
the at least two guide portions extend radially outwardly from the at least one inner-link tooth as viewed in the axial direction.

15. The bicycle sprocket assembly according to claim 14, wherein
the at least two guide portion includes guide portions each provided on the first side surface to guide the bicycle chain from the bicycle sprocket toward the smaller sprocket in the second shifting operation,
the at least one inner-link tooth includes inner-link teeth each extending radially outwardly from the second sprocket body to be received in only the inner link space, and
the guide portions respectively extend radially outwardly from the inner-link teeth as viewed in the axial direction.

16. The bicycle sprocket assembly according to claim 14, wherein
the at least two guide portions extend radially outwardly from the upstream side toward a downstream side reverse to the upstream side as viewed in the axial direction.

17. The bicycle sprocket assembly according to claim 13, wherein
the second sprocket teeth include at least one outer-link tooth extending radially outwardly from the second sprocket body to be received in only the outer link space, and
the at least one recess is disposed radially outwardly of the at least one outer-link tooth as viewed in the axial direction.

18. The bicycle sprocket assembly according to claim 13, wherein
the bicycle sprocket comprises a shifting facilitation area configured to facilitate at least one of
   the first shifting operation and the second shifting operation, and
   at least one of the at least two guide portions is provided in the shifting facilitation area.

19. The bicycle sprocket assembly according to claim 13, wherein
the bicycle sprocket further comprises an additional shifting facilitation projection provided on the first side surface to facilitate the second shifting operation, and
at least one of the at least two guide portions is provided on the upstream side with respect to the additional shifting facilitation projection.

20. The bicycle sprocket assembly according to claim 13, wherein
the second sprocket teeth include
   at least one outer-link tooth extending radially outwardly from the second sprocket body to be received in only the outer link space, the at least one outer-link tooth having a larger maximum axial width defined in the axial direction, and
   at least one inner-link tooth extending radially outwardly from the second outer sprocket body to be received in only the inner link space, the at least one inner-link tooth having a smaller maximum axial width defined in the axial direction, the larger maximum axial width being larger than the smaller maximum axial width.

21. The bicycle sprocket assembly according to claim 13, wherein
the at least two guide portions include a first guide portion and a second guide portion,
the first guide portion is provided in the upstream angular area and has a first circumferential width defined in the circumferential direction,
the second guide portion is provided outside the upstream angular area and has a second circumferential width defined in the circumferential direction, and
the first circumferential width is larger than the second circumferential width.

22. The bicycle sprocket assembly according to claim 21, wherein
the first guide portion has a first maximum circumferential width, and
the first maximum circumferential width ranges from 6 mm to 8 mm.

23. The bicycle sprocket assembly according to claim 21, wherein
the first guide portion has a first axial length defined from the first sprocket body in the axial direction, the second guide portion has a second axial length defined from the first sprocket body in the axial direction, and the first axial length is substantially equal to the second axial length.

24. The bicycle sprocket assembly according to claim 21, wherein the first sprocket body includes a resin part, and the first guide portion and the second guide portion are integrally provided with the resin part as a one-piece unitary member.

25. The bicycle sprocket assembly according to claim 13, wherein the at least two guide portions include a first guide portion having a metallic part.

26. The bicycle sprocket assembly according to claim 25, wherein the metallic part is at least partly exposed from the first sprocket body.

27. The bicycle sprocket assembly according to claim 25, wherein the first guide portion is provided in the upstream angular area, and the at least two guide portions include a second guide portion provided outside the upstream angular area, the second guide portion being made of a resin material.

28. The bicycle sprocket assembly according to claim 25, wherein the first sprocket body includes a resin part, and the first guide portion is provided at the resin part.

29. The bicycle sprocket assembly according to claim 28, wherein the metallic part is at least partly embedded in the resin part.

30. The bicycle sprocket assembly according to claim 28, wherein the at least two guide portions include an additional guide portion, and the additional guide portion is integrally provided with the resin part as a one-piece unitary member.

31. The bicycle sprocket assembly according to claim 13, wherein downstream side surfaces of the at least two guide portions are arranged in the circumferential direction at a first pitch.

32. A bicycle sprocket comprising:

a first sprocket body;

first sprocket teeth extending radially outwardly from the first sprocket body to define a first chain-phase state where at least one of the first sprocket teeth is received in only one of an inner link space defined between an opposed pair of inner link plates of a bicycle chain, and an outer link space defined between an opposed pair of outer link plates of the bicycle chain;

a first side surface provided on the first sprocket body and facing toward a first side of an axial direction of a rotational center axis of the bicycle sprocket;

a second side surface provided on the first sprocket body and facing toward a second side of the axial direction reverse to the first side;

at least two guide portions provided on the first side surface to guide the bicycle chain from the bicycle sprocket toward a smaller sprocket in a shifting operation in which the bicycle chain is shifted from the bicycle sprocket to the smaller sprocket; and at least one recess provided on the first side surface so as to be provided between and defined by adjacent guide portions of the at least two guide portions in a circumferential direction defined about the rotational center axis, at least one of the at least one recess being provided in an upstream angular range defined from a dead center to an upstream side in a driving state where the bicycle sprocket is rotated about the rotational center axis during pedaling and within 90 degrees in the circumferential direction.

33. A bicycle sprocket assembly comprising:

a bicycle sprocket comprising:

a first sprocket body;

first sprocket teeth extending radially outwardly from the first sprocket body to define a first chain-phase state where at least one of the first sprocket teeth is received in only one of an inner link space defined between an opposed pair of inner link plates of a bicycle chain, and an outer link space defined between an opposed pair of outer link plates of the bicycle chain;

a first side surface provided on the first sprocket body and facing toward a first side of an axial direction of a rotational center axis of the bicycle sprocket;

a second side surface provided on the first sprocket body and facing toward a second side of the axial direction reverse to the first side;

at least one shifting facilitation projection configured to facilitate a first shifting operation in which the bicycle chain is shifted from a smaller sprocket to the bicycle sprocket at least one guide portion provided on the first side surface to guide the bicycle chain from the bicycle sprocket toward the smaller sprocket in a second shifting operation in which the bicycle chain is shifted from the bicycle sprocket to the smaller sprocket; and at least one recess provided on the first side surface so as to be adjacent to the at least one guide portion in a circumferential direction defined about the rotational center axis, at least one of the at least one recess being provided in an upstream angular area defined from the at least one shifting facilitation projection to an upstream side in a driving state where the bicycle sprocket is rotated about the rotational center axis during pedaling and within 90 degrees in the circumferential direction; and the smaller sprocket comprising:

a second sprocket body; and second sprocket teeth extending radially outwardly from the second sprocket body to define a second chain-phase state where at least one of the second sprocket teeth is received in only one of the inner link space and the outer link space, wherein the at least one guide portion includes guide portions, and a total number of the guide portions is a half of a total number of the second sprocket teeth.

34. A bicycle sprocket assembly comprising:

a larger sprocket comprising:

a first sprocket body;

first sprocket teeth extending radially outwardly from the first sprocket body;

a first side surface facing in an axial direction of a rotational center axis of the bicycle sprocket assembly; and a second side surface facing in the axial direction, the second side surface being provided on a reverse side of the first side surface in the axial direction; and a smaller sprocket comprising:

a second sprocket body; and second sprocket teeth extending radially outwardly from the second sprocket body to define a chain-phase state where at least one of the second sprocket teeth is received in only one of
- an inner link space defined between an opposed pair of inner link plates of a bicycle chain, and
- an outer link space defined between an opposed pair of outer link plates of the bicycle chain, the second sprocket teeth including
- at least one outer-link tooth extending radially outwardly from the second sprocket body to be received in only the outer link space, and
- at least one inner-link tooth extending radially outwardly from the second sprocket body to be received in only the inner link space, the first sprocket body including at least one recess provided on the first side surface to reduce interference between the larger sprocket and the bicycle chain, the at least one recess being disposed radially outwardly of the at least one outer-link tooth as viewed in the axial direction, and the first sprocket body including a plurality of guide portions provided on the first side surface to guide the bicycle chain from the larger sprocket toward the smaller sprocket in a shifting operation in which the bicycle chain is shifted from the larger sprocket to the smaller sprocket, the at least one recess being provided between and defined by adjacent guide portions of the plurality of guide portions in a circumferential direction defined about the rotational center axis.

* * * * *

UNITED STATES PATENT AND TRADEMARK OFFICE
CERTIFICATE OF CORRECTION

PATENT NO. : 10,625,821 B2
APPLICATION NO. : 15/686122
DATED : April 21, 2020
INVENTOR(S) : Ken Yokoi and Akinobu Sugimoto It is certified that error appears in the above-identified patent and that said Letters Patent is hereby corrected as shown below:

On the Title Page

Item (63) the Related U.S. Application Data, "filed on Mar. 7, 2017" should be changed to --filed on Mar. 17, 2017--.

Signed and Sealed this
Twenty-eighth Day of July, 2020

Andrei Iancu
*Director of the United States Patent and Trademark Office*